(12) United States Patent
Kuno

(10) Patent No.: US 7,869,066 B2
(45) Date of Patent: Jan. 11, 2011

(54) DEVICE, METHOD, AND COMPUTER-READABLE MEDIUM FOR CREATING PRINT DATA

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1276 days.

(21) Appl. No.: 11/285,291

(22) Filed: Nov. 23, 2005

(65) Prior Publication Data

US 2006/0129969 A1    Jun. 15, 2006

(30) Foreign Application Priority Data

Nov. 26, 2004    (JP)    .............................. 2004-341928

(51) Int. Cl.
G06K 15/00  (2006.01)
G06F 3/12   (2006.01)
B41J 29/38  (2006.01)
B41J 29/393 (2006.01)
B41J 2/145  (2006.01)
B41J 2/21   (2006.01)

(52) U.S. Cl. .................... 358/1.14; 358/1.12; 358/1.13; 358/1.15; 347/14; 347/19; 347/41; 347/43

(58) Field of Classification Search ................ 358/1.15, 358/1.2, 1.9, 3.23, 1.17, 3.28, 1.16, 1.18; 347/15, 43, 41, 19, 10, 16, 14
See application file for complete search history.

(56) References Cited

U.S. PATENT DOCUMENTS 5,363,212 A * 11/1994 Taniuchi et al. ............. 358/452

(Continued)

FOREIGN PATENT DOCUMENTS

JP    61-262131 A    11/1986

(Continued)

OTHER PUBLICATIONS

Co-pending U.S. Appl. No. 11/281,463, filed Nov. 18, 2005.

(Continued)

Primary Examiner—Twyler L Haskins
Assistant Examiner—Jonathan R Beckley
(74) Attorney, Agent, or Firm—Banner & Witcoff, Ltd.

(57) ABSTRACT

This specification discloses a computer program product manufacturing method. This method is provided with a forming step, a combining step, and a storing step. The forming step instructs the printer to form a dot at a predetermined coordinate. The combining step creates a combination of the predetermined coordinate and a sub-coordinate which is different from the predetermined coordinate. A distance between the predetermined coordinate and a position of a dot formed when the printer tries to form the dot at the sub-coordinate is shorter than the distance between the predetermined coordinate and the position of the dot formed in the forming step. A storing step stores a computer program into a memory medium. The computer program includes instructions for ordering the computer device to perform a choosing step and a converting step. The choosing step chooses a coordinate from bit-mapped data. The converting step converts the coordinate chosen in the choosing step into the sub-coordinate in a case where the coordinate chosen in the choosing step has been combined with the sub-coordinate in the combining step.

10 Claims, 19 Drawing Sheets

U.S. PATENT DOCUMENTS

| | | | |
|---|---|---|---|
| 6,142,598 | A | 11/2000 | Iwasaki et al. |
| 6,238,105 | B1 * | 5/2001 | Pardo .................. 358/1.17 |
| 6,283,571 | B1 | 9/2001 | Zhou et al. |
| 6,471,352 | B2 | 10/2002 | Akahira |
| 6,474,777 | B1 * | 11/2002 | Fujita et al. ............. 347/41 |
| 6,533,182 | B1 * | 3/2003 | Ohshima et al. ......... 235/494 |
| 6,782,116 | B1 * | 8/2004 | Zhao et al. ............. 382/100 |
| 6,975,425 | B1 * | 12/2005 | Abe et al. .............. 358/1.18 |
| 6,984,011 | B2 * | 1/2006 | Shimada et al. .......... 347/19 |
| 7,018,010 | B2 * | 3/2006 | Kobayashi et al. ........ 347/19 |
| 7,073,883 | B2 * | 7/2006 | Billow ................... 347/19 |
| 7,086,711 | B2 * | 8/2006 | Iwao et al. .............. 347/10 |
| 7,118,191 | B2 * | 10/2006 | Fagan et al. ............. 347/41 |
| 7,198,347 | B2 * | 4/2007 | Tayuki .................. 347/19 |
| 7,222,927 | B2 | 5/2007 | Eguchi et al. |
| 7,290,858 | B2 * | 11/2007 | Furuichi et al. ........... 347/43 |
| 7,301,672 | B2 * | 11/2007 | Abe et al. ............... 358/1.9 |
| 7,336,392 | B2 * | 2/2008 | Kakutani ................. 358/1.9 |
| 7,487,324 | B2 * | 2/2009 | Tanaka .................. 711/173 |
| 2001/0026307 | A1 | 10/2001 | Akahira |
| 2001/0038397 | A1 | 11/2001 | Kobayashi et al. |
| 2004/0046832 | A1 | 3/2004 | Kuwahara |
| 2004/0095404 | A1 | 5/2004 | Iwao et al. |
| 2004/0189727 | A1 | 9/2004 | Eguchi et al. |
| 2006/0109515 | A1 * | 5/2006 | Zhao et al. .............. 358/3.28 |

FOREIGN PATENT DOCUMENTS

| | | |
|---|---|---|
| JP | 7-323609 | 12/1995 |
| JP | 2001-228320 A | 8/2001 |
| JP | 2003-094693 A | 4/2003 |
| JP | 2004-009549 A | 1/2004 |
| JP | 2004-017565 A | 1/2004 |
| JP | 2004-262102 A | 9/2004 |
| WO | 03/045696 A1 | 6/2003 |

OTHER PUBLICATIONS

Co-pending U.S. Appl. No. 11/277,795, filed Mar. 29, 2006.
JP Office Action dtd Jun. 8, 2010, JP Appln. 2004-335521, English translation.
JP Office Action dtd Jun. 8, 2010, JP Appln. 2004-341928, English translation.
US Office Action dtd Jun. 24, 2010, U.S. Appl. No. 11/281,463.

* cited by examiner

FIG. 7

| Row | Difference Amount |
|---|---|
| 1 | 0 |
| 2 | 0 |
| 3 | −0.7 |
| 4 | −0.2 |
| 5 | +0.1 |
| 6 | +0.7 |
| 7 | 0 |
| 8 | −0.3 |
| ⋮ | ⋮ |

FIG. 11

|   | 1 | 2 | 3 | 4 | 5 | 6 | 7 | 8 | .... | → Row(X) |
|---|---|---|---|---|---|---|---|---|------|----------|
| M | 1 | 0 | 0 | 1 | 1 | 0 | 1 | 1 | .... | → one line data |
| M+1 | 0 | 1 | 0 | 1 | 0 | 1 | 0 | 1 | .... | → one line data |
| M+2 | 1 | 1 | 1 | 0 | 0 | 1 | 0 | 1 | .... | → one line data |
| ⋮ | ⋮ | ⋮ | ⋮ | ⋮ | ⋮ | ⋮ | ⋮ | ⋮ | .... | |

↓

Line (Y)

FIG. 14

| Difference Amount | Sub-Coordinate and Scale of Dot | | | | | | | |
|---|---|---|---|---|---|---|---|---|
| | -4 | -3 | -2 | -1 | 0 | 1 | 2 | 3 |
| ~-0.6875 | | | | | | | | 3 |
| -0.6875~-0.5625 | | | | | | | 2 | 2 |
| -0.5625~-0.4375 | | | | | | | 3 | |
| -0.4375~-0.3125 | | | | | | 2 | 2 | |
| -0.3125~-0.1875 | | | | | | 3 | | |
| -0.1875~-0.0625 | | | | | 2 | 2 | | |
| -0.0625~0.0625 | | | | | 3 | | | |
| 0.0625~0.1875 | | | | 2 | 2 | | | |
| 0.1875~0.3125 | | | | 3 | | | | |
| 0.3125~0.4375 | | | 2 | 2 | | | | |
| 0.4375~0.5625 | | | 3 | | | | | |
| 0.5625~0.6875 | | 2 | 2 | | | | | |
| 0.6875~0.8125 | | 3 | | | | | | |
| 0.8125~0.9375 | 2 | 2 | | | | | | |
| 0.9375~ | 3 | | | | | | | |

|  | 1 | 2 | 3 | 4 | 5 | 6 | 7 | 8 | ... |
|---|---|---|---|---|---|---|---|---|---|
| 46au -4 | 0 | 0 | 0 | 0 | 0 | 0 | 0 | 0 | ... |
| 46au -3 | 0 | 0 | 0 | 0 | 0 | 0 | 0 | 0 | ... |
| 46au -2 | 0 | 0 | 0 | 0 | 0 | 0 | 0 | 0 | ... |
| 46au -1 | 0 | 0 | 0 | 0 | 2 | 0 | 0 | 0 | ... |
| 46ad 0 | 3 | 0 | 0 | 0 | 2 | 0 | 3 | 0 | ... |
| 46ad 1 | 0 | 0 | 0 | 3 | 0 | 0 | 0 | 3 | ... |
| 46ad 2 | 0 | 0 | 0 | 0 | 0 | 0 | 0 | 0 | ... |
| 46ad 3 | 0 | 0 | 0 | 0 | 0 | 0 | 0 | 0 | ... |

(b)

|  | 1 | 2 | 3 | 4 | 5 | 6 | 7 | 8 | ... |
|---|---|---|---|---|---|---|---|---|---|
| 46au -4 | 3 | 0 | 0 | 0 | 2 | 0 | 3 | 0 | ... |
| 46au -3 | 0 | 0 | 0 | 3 | 0 | 0 | 0 | 3 | ... |
| 46au -2 | 0 | 0 | 0 | 0 | 0 | 0 | 0 | 0 | ... |
| 46au -1 | 0 | 0 | 0 | 0 | 0 | 0 | 0 | 0 | ... |
| 46ad 0 | 0 | 0 | 0 | 0 | 0 | 0 | 0 | 0 | ... |
| 46ad 1 | 0 | 0 | 0 | 0 | 0 | 0 | 0 | 0 | ... |
| 46ad 2 | 0 | 0 | 0 | 0 | 0 | 0 | 0 | 0 | ... |
| 46ad 3 | 0 | 0 | 0 | 0 | 0 | 0 | 0 | 0 | ... |

(c)

|  | 1 | 2 | 3 | 4 | 5 | 6 | 7 | 8 | ... |
|---|---|---|---|---|---|---|---|---|---|
| 46au -4 | 3 | 0 | 0 | 0 | 2 | 0 | 3 | 0 | ... |
| 46au -3 | 0 | 0 | 0 | 3 | 0 | 3 | 0 | 3 | ... |
| 46au -2 | 0 | 0 | 0 | 0 | 0 | 0 | 0 | 0 | ... |
| 46au -1 | 0 | 0 | 0 | 0 | 0 | 0 | 0 | 0 | ... |
| 46ad 0 | 0 | 3 | 0 | 0 | 0 | 0 | 0 | 0 | ... |
| 46ad 1 | 0 | 0 | 0 | 3 | 0 | 0 | 0 | 3 | ... |
| 46ad 2 | 0 | 0 | 0 | 0 | 0 | 0 | 0 | 0 | ... |
| 46ad 3 | 0 | 0 | 0 | 0 | 0 | 0 | 0 | 0 | ... |

(d)

|  | 1 | 2 | 3 | 4 | 5 | 6 | 7 | 8 | ... |
|---|---|---|---|---|---|---|---|---|---|
| 46au -4 | 0 | 3 | 0 | 0 | 0 | 0 | 0 | 0 | ... |
| 46au -3 | 0 | 0 | 0 | 3 | 0 | 0 | 0 | 3 | ... |
| 46au -2 | 0 | 0 | 0 | 0 | 0 | 0 | 0 | 0 | ... |
| 46au -1 | 0 | 0 | 0 | 0 | 0 | 0 | 0 | 0 | ... |
| 46ad 0 | 0 | 0 | 0 | 0 | 0 | 0 | 0 | 0 | ... |
| 46ad 1 | 0 | 0 | 0 | 0 | 0 | 0 | 0 | 0 | ... |
| 46ad 2 | 0 | 0 | 0 | 0 | 0 | 0 | 0 | 0 | ... |
| 46ad 3 | 0 | 0 | 0 | 0 | 0 | 0 | 0 | 0 | ... |

(e)

|  | 1 | 2 | 3 | 4 | 5 | 6 | 7 | 8 | ... |
|---|---|---|---|---|---|---|---|---|---|
| 46au -4 | 0 | 3 | 0 | 0 | 0 | 0 | 0 | 0 | ... |
| 46au -3 | 0 | 0 | 0 | 3 | 0 | 3 | 0 | 3 | ... |
| 46au -2 | 0 | 0 | 0 | 0 | 0 | 0 | 0 | 0 | ... |
| 46au -1 | 0 | 0 | 0 | 0 | 0 | 0 | 0 | 0 | ... |
| 46ad 0 | 3 | 3 | 0 | 0 | 0 | 0 | 0 | 0 | ... |
| 46ad 1 | 0 | 0 | 0 | 0 | 0 | 0 | 0 | 3 | ... |
| 46ad 2 | 0 | 0 | 0 | 0 | 0 | 0 | 0 | 0 | ... |
| 46ad 3 | 0 | 0 | 3 | 0 | 0 | 0 | 0 | 0 | ... |

(f)

|  | 1 | 2 | 3 | 4 | 5 | 6 | 7 | 8 | ... |
|---|---|---|---|---|---|---|---|---|---|
| 46au -4 | 3 | 3 | 0 | 0 | 0 | 0 | 0 | 0 | ... |
| 46au -3 | 0 | 0 | 0 | 0 | 0 | 0 | 0 | 3 | ... |
| 46au -2 | 0 | 0 | 0 | 0 | 0 | 0 | 0 | 0 | ... |
| 46au -1 | 0 | 0 | 3 | 0 | 0 | 0 | 0 | 0 | ... |
| 46ad 0 | 0 | 0 | 0 | 0 | 0 | 0 | 0 | 0 | ... |
| 46ad 1 | 0 | 0 | 0 | 0 | 0 | 0 | 0 | 0 | ... |
| 46ad 2 | 0 | 0 | 0 | 0 | 0 | 0 | 0 | 0 | ... |
| 46ad 3 | 0 | 0 | 0 | 0 | 0 | 0 | 0 | 0 | ... |

FIG. 16

| | | 1 | 2 | 3 | 4 | 5 | 6 | 7 | 8 | ···· → Row(X) |
|---|---|---|---|---|---|---|---|---|---|---|
| D1 | M−4t | 0 | 0 | 0 | 0 | 0 | 0 | 0 | 0 | |
| | M−3t | 0 | 0 | 0 | 0 | 0 | 0 | 0 | 0 | ···· |
| | M−2t | 0 | 0 | 0 | 0 | 0 | 0 | 0 | 0 | |
| | M−t | 0 | 0 | 0 | 0 | 2 | 0 | 0 | 0 | |
| D2 | M+1−4t | 3 | 0 | 0 | 0 | 2 | 0 | 3 | 0 | |
| | M+1−3t | 0 | 0 | 0 | 3 | 0 | 3 | 0 | 3 | ···· |
| | M+1−2t | 0 | 0 | 0 | 0 | 0 | 0 | 0 | 0 | |
| | M+1−t | 0 | 0 | 0 | 0 | 0 | 0 | 0 | 0 | |
| D3 | M+2−4t | 0 | 3 | 0 | 0 | 0 | 0 | 0 | 0 | |
| | M+2−3t | 0 | 0 | 0 | 3 | 0 | 3 | 0 | 3 | ···· |
| | M+2−2t | 0 | 0 | 0 | 0 | 0 | 0 | 0 | 0 | |
| | M+2−t | 0 | 0 | 0 | 0 | 0 | 0 | 0 | 0 | |
| D4 | M+3−4t | 3 | 3 | 0 | 0 | 0 | 0 | 0 | 0 | |
| | M+3−3t | 0 | 0 | 0 | 0 | 0 | 0 | 0 | 3 | ···· |
| | M+3−2t | 0 | 0 | 0 | 0 | 0 | 0 | 0 | 0 | |
| | M+3−t | 0 | 0 | 3 | 0 | 0 | 0 | 0 | 0 | |

↓ Y (a)

(b)

DEVICE, METHOD, AND COMPUTER-READABLE MEDIUM FOR CREATING PRINT DATA

CROSS-REFERENCE TO RELATED APPLICATION

This application claims priority to Japanese Patent Application No. 2004-341928, filed on Nov. 26, 2004, the contents of which are hereby incorporated by reference into the present application.

BACKGROUND OF THE INVENTION

1. Field of the Invention

The present invention relates to a device for creating print data utilized by a printer. The present invention further relates to a method for creating print data and a computer program product for creating print data. Further, the present invention relates to a computer program product manufacturing method. The printer of the present specification includes all devices for printing words or images onto a print medium. For example, the printer of the present specification includes ink jet printers and laser printers. Ink jet printers and laser printers include copying machines, fax machines, multifunctional products, etc.

2. Description of the Related Art

A printer utilizes colorant such as ink, toner, etc. to form points on a print medium. Desired words or images are thus formed on the print medium. In the present specification, a point formed on a print medium by a printer utilizing colorant is termed a dot. For example, in the case of an ink jet printer, a point formed on a print medium by discharging a droplet of ink from a nozzle toward the print medium is termed a dot. Furthermore, a point formed on a print medium by discharging a plurality of ink droplets onto the same location on the print medium from one or a plurality of nozzles is also termed a dot.

An ink jet printer discharges ink droplets from nozzles towards a print medium, thus forming dots on the print medium. The ink jet printer may be utilized while connected with an external device such as a personal computer, or the like. In the case where an image shown on a display of the personal computer is to be printed by the ink jet printer, the personal computer creates bit-mapped data. The created bit-mapped data includes color information of each coordinate. In the case of a color image, the color information of the bit-mapped data is represented as a combination of color and color density of that color. Consequently, bit-mapped data of the color image includes a plurality of combinations of coordinate, color, and color density. Further, in the case of a monochrome image, the color information of the bit-mapped data can be represented as a combination of single color and color density, or can be represented only as color density. The bit-mapped data of the monochrome image includes a plurality of combinations of coordinate, single color, and color density (or a plurality of combinations of coordinate and color density).

The personal computer chooses coordinates at which dots will be formed from the bit-mapped data. This process is performed based on the color information of the coordinates included in the bit-mapped data. The coordinates are chosen from the bit-mapped data using, for example, the halftone process or the dither method. The personal computer outputs the information representing the chosen coordinates to the ink jet printer. Here, this information is termed print data. The print data for color printing can be formed from, for example, combinations of a chosen coordinate and color (for example, any one out of cyan, magenta, yellow, and black). The ink jet printer receives the print data output from the personal computer, and forms dots based on the print data that has been received. For example, in the case where a combination of the coordinate (x, y) and yellow is included in the print data, the ink jet printer forms a yellow dot at the coordinate (x, y).

FIG. 18 is a figure schematically showing an example of dots 100 formed by the ink jet printer. In the example shown in FIG. 18, the dots 100 are formed in 8 rows×8 lines. The dots have not been filled with ink in FIG. 18. The numbers shown above the dots 100 are row numbers, and the numbers shown to the left of the dots 100 are line numbers. Two dots 100 that adjoin in the row direction or line direction overlap. The arrow A in the figure shows the direction of movement of the print medium with respect to the nozzles. Below, eight dots aligned in the A direction will be termed a dot row, and eight dots aligned in a direction orthogonal to the A direction will be termed a dot line. In this example, eight dot rows and eight dot lines are formed. Below, the rows will be represented as x coordinates and the lines will be represented as y coordinates. Sixty four coordinates (1, 1), (1, 2), etc. are included in the print data being utilized to form the dots 100 shown in this example.

Ink is discharged from the nozzles while the print medium is moving with respect to the nozzles in the direction of the arrow A. For example, the eight dots of the first dot row are formed by continuously discharging ink droplets from one nozzle while the print medium is moving with respect to the nozzle in the direction of the arrow A. Similarly, the eight dots of the second dot row are also formed by continuously discharging ink from one different nozzle. Eight nozzles that are offset in an X direction are required to form the eight dot rows shown in FIG. 18. All the dots 100 are formed uniformly in the example shown in FIG. 18, and printing could be termed satisfactory.

However, the timing at which ink is discharged from a certain nozzle may be earlier or later than the intended timing. In this case, the dot row formed by this nozzle is formed at a position that is displaced with respect to the dot rows formed by the other nozzles. FIG. 19 shows an example of the dots 100 where the dot rows were formed by eight nozzles that include a nozzle discharging ink at a timing later than the intended timing. In this example, the nozzle for forming the fifth dot row discharges ink at a timing later than the intended timing. As a result, the fifth dot row is displaced upwards. Here, satisfactory printing results cannot be achieved.

BRIEF SUMMARY OF THE INVENTION

The present invention presents a technique whereby satisfactory printing results can be achieved. An example of the present invention will be described using FIG. 20. FIG. 20 is a figure for allowing an overview of the present invention to be described. A method of manufacturing a computer program product is taught in the present specification. This computer program product is utilized by a computer device to create print data utilized by a printer. In this method, a forming step of instructing the printer to form a dot at a predetermined coordinate is executed. In the example shown in FIG. 20, the printer is instructed to form a dot at a predetermined coordinate E1. In this example, a dot is formed at a coordinate E2.

Next, in the case where a distance between the predetermined coordinate E1 and the coordinate E2 is more than a predetermined distance, a combining step is executed to create a combination of the predetermined coordinate E1 and a sub-coordinate. The predetermined distance may be chosen to be any value greater than zero. The coordinate adopted as a sub-coordinate has the following relationship: a distance between the predetermined coordinate E1 and the position of a dot formed when the printer tries to form the dot at the sub-coordinate is shorter than the distance F1 between the predetermined coordinate E1 and the position E2 of the dot formed in the forming step. In the example shown in FIG. 20, a dot is formed at a coordinate E4 when the printer tried to form a dot at a sub-coordinate E3. A distance F2 between E1 and E4 is shorter than the distance F1 between E1 and E2. Consequently, the above relationship is fulfilled by adopting the sub-coordinate E3. In this step, a combination of the coordinate E1 and the sub-coordinate E3 is created.

In the present method, a storing step of storing a computer program into a memory medium is executed. The computer program includes instructions for ordering the computer device to perform a choosing step and a converting step. In the choosing step, a coordinate is chosen from bit-mapped data. The bit-mapped data includes a plurality of combinations of a coordinate and color information. A combination of the color and color density may be included in the color information. Alternatively, only color density may be included in the color information. In the choosing step, a coordinate is chosen based on the color information combined with the coordinate. In the choosing step, one coordinate may be chosen based on the color information of a plurality of coordinates. Alternatively, it may be determined whether to choose the coordinate based only on the color information of one coordinate. In the case where the coordinate chosen in the choosing step is E1 of FIG. 20, the coordinate E1 chosen in the choosing step is converted into the sub-coordinate E3 in the converting step.

In the case of the above example, the print data includes the information that the dot should be formed at the sub-coordinate E3. The printer tries to form the dot at the sub-coordinate E3 and, in this case, the dot is formed at the coordinate E4.

FIG. 20 and the contents based thereon that have been described above are an example, and the scope of the present invention is not restricted based on FIG. 20 or the above contents. For example, the scope of the present invention is not restricted by the directions X, Y, and A in FIG. 20. The scope of the present invention is determined on the basis of the claims.

BRIEF DESCRIPTION OF THE DRAWINGS

FIG. 6 (b) shows dots that have been formed in positions displaced from the base line.

FIG. 7 shows contents of a first table.

FIG. 11 shows contents stored in a two value data memory.

FIG. 13 (b) shows eight sub-coordinates obtained from the coordinate shown in FIG. 13 (a).

FIG. 14 shows the contents of a second table.

FIG. 15 shows how the contents stored in the buffer memory change. FIG. 15 (a) shows the contents stored when one line data of a line M has been written. FIG. 15 (b) shows the contents stored when the stored contents of a lower storage region of FIG. 15 (a) are shifted to an upper storage region. FIG. 15 (c) shows the contents stored when one line data of line M+1 has been written into the stored contents of FIG. 15 (b). FIG. 15 (d) shows the contents stored when the stored contents of the lower storage region of FIG. 15 (c) are shifted to the upper storage region. FIG. 15 (e) shows the contents stored when one line data of line M+2 has been written into the stored contents of FIG. 15 (d). FIG. 15 (f) shows the contents stored when the stored contents of the lower storage region of FIG. 15 (e) are shifted to the upper storage region.

FIG. 16 shows contents stored in a print data memory.

FIG. 17 (b) shows dots formed when the representative embodiment has been adopted.

DETAILED DESCRIPTION OF THE INVENTION

The computer program product can be utilized for creating print data utilized by an ink jet printer. The ink jet printer comprises a plurality of nozzles for discharging ink toward a print medium and a transferring device for transferring the nozzles and/or the print medium along a Y direction in a state in which at least one nozzle faces the print medium. Each nozzle is offset along a X direction which is perpendicular to the Y direction. Further, the ink jet printer may be either a line type or a serial type.

Figure 20:
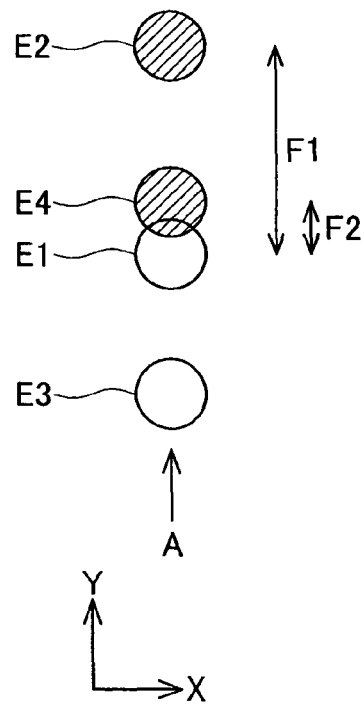
FIG. 20 is a figure for allowing an overview of the present invention to be described.

As shown in FIG. 20, it is preferred that a predetermined coordinate E1 and a sub-coordinate E3 are aligned in a Y direction (an A direction). In this case, it is preferred that if a dot E2 is formed further along in the Y direction (upwards) relative to the intended coordinate E1, the sub-coordinate E3 is formed further along in the opposite side in the Y direction (downwards) relative to the coordinate E1. Further, it is preferred that if a dot is formed further along in the opposite side (downwards) in the Y direction from the coordinate E1, a sub-coordinate is formed further along in the Y direction (upwards) relative to the intended coordinate E1.

A combination of the predetermined coordinate and an adjustment amount can be created in a combining step. For example, a combination of the predetermined coordinate (x, y) and the adjustment amount ($\alpha$, $\beta$) can be created in the combining step. In this case, the coordinate (x, y) may be converted in a converting step into a sub-coordinate (x+$\alpha$, y+$\beta$) by adding the adjustment amount ($\alpha$, $\beta$) to the coordinate (x, y). Creating the combination of the predetermined coordinate and the adjustment amount is equivalent to creating a combination of the predetermined coordinate and the sub-coordinate. The aforementioned $\alpha$ and/or $\beta$ can be either positive or negative.

Further, if only one of the X coordinate or the Y coordinate needs to be amended, the adjustment amount does not need to be represented as a two value coordinate. For example, if only the Y coordinate of the predetermined coordinate (x, y) needs to be amended, a combination of the predetermined coordinate (x, y) and the adjustment amount β can be created. In this case, the coordinate (x, y) can be converted into the sub-coordinate (x, y+β) by adding the adjustment amount β to the Y coordinate during the converting step.

The process of 'adding the adjustment amount' includes all of addition, subtraction, multiplication, division, etc. Further, the process of 'adding the adjustment amount' is not restricted to actual calculation. For example, the process of adding the adjustment amount may be executed by loading a flag into a predetermined storage element of the computer device.

Each nozzle of the ink jet printer is offset in the X direction. As a result, the dots that can be formed by one nozzle have the same X coordinate, and are aligned in the Y direction.

The dots formed by one nozzle tend to be displaced by the same amount in the Y direction. For example, if dots are to be formed at (x, y1), (x, y2), and (x, y3), the dots may be formed at (x, y1+β'), (x, y2+β'), and (x, y3+β'). In this case, the dots will be formed close to (x, y1), (x, y2), and (x, y3) if an instruction is given to the printer to form the dots at, for example, (x, y1−β'), (x, y2−β'), and (x, y3−β').

As a result, it is possible to convert all the coordinates corresponding to one nozzle into sub-coordinates by setting one adjustment amount (−β' in the above example) for the one nozzle. For example, a combination may be created of a nozzle A and an adjustment amount α. Moreover, a combination may be created of a nozzle B and an adjustment amount β.

The nozzle and the adjustment amount may be combined directly or indirectly. For example, if the dot was to be formed by the nozzle A at the coordinate (x, y) during the forming step, and the dot was instead formed at (x, y+β), the combination of the nozzle A and β may be created in the combining step. Here, β is a difference amount between the Y coordinate (y) of the coordinate (x, y) that corresponds to the nozzle A and the Y coordinate (y+β) of the dot formed by the nozzle A during the forming step. A combination of the difference amount and the adjustment amount may be created in the combining step. In this example, a combination of a difference amount β and an adjustment amount (for example, −β) may be created.

The 'combination of the difference amount and the adjustment amount' includes a combination of a range of the difference amount and the adjustment amount. For example, a combination of a range (β1 to β2) of the difference amount and the adjustment amount β3 may be created.

In the present specification, a device is taught for creating print data utilized by a printer. The print data creating device comprises a storage, a choosing device and a converting device.

The storage may store a combination of a predetermined coordinate and a sub-coordinate which is different from the predetermined coordinate. A distance between the predetermined coordinate and a position of a dot formed when the printer tries to form the dot at the sub-coordinate is shorter than a distance between the predetermined coordinate and a position of a dot formed when the printer tries to form the dot at the predetermined coordinate.

The choosing device may choose a coordinate from bit-mapped data. The bit-mapped data includes a plurality of combinations of a coordinate and color information. The choosing device chooses the coordinate based on the color information being combined with the coordinate.

The converting device may convert the coordinate chosen by the choosing device into the sub-coordinate in a case where the coordinate chosen by the choosing device has been combined with the sub-coordinate in the storage.

The print data creating device may create print data utilized by an ink jet printer. Further, the print data creating device may utilize any of the aforementioned techniques.

The choosing device may choose a plurality of coordinates from the bit-mapped data. For example, (x1, y1), (x2, y2), and (x3, y3) may be chosen. For example, when the storage is storing the combination of the coordinate (x1, y1) and the sub-coordinate (x1+α, y1+β), the converting device converts the chosen coordinate (x1, y1) into the sub-coordinate (x1+α, y1+β). The converting device does not convert the coordinate (x2, y2) into a sub-coordinate that differs therefrom. Nor does the converting device convert the coordinate (x3, y3) into a sub-coordinate that differs therefrom. In this case, print data that includes (x1+α, y1+β), (x2, y2), and (x3, y3) may be created.

The storage may store a plurality of combinations. For example, the storage may store the coordinate (x1, y1) and the sub-coordinate (x1+α, y1+β) as well as the coordinate (x2, y2) and the sub-coordinate (x2+α, y2+β). In this case, the converting device converts (x1, y1) and (x2, y2) into sub-coordinates, and does not convert (x3, y3) into a sub-coordinate. In this case, print data that includes (x1+α, y1+β), (x2+α, y2+β), and (x3, y3) may be created.

The storage storing the combination of the coordinate and the adjustment amount is equivalent to storing the combination of predetermined coordinate and the sub-coordinate.

The ink jet printer may be capable of changing a unit ink quantity, this being an ink quantity discharged from one nozzle to form one dot on the print medium.

In the case of the above example, it is possible to create print data including the combination of (x1+α, y1+β) and the unit ink quantity, the combination of (x2+α, y2+β) and the unit ink quantity, and the combination of (x3, y3) and the unit ink quantity.

The combinations being stored in the storage may include the predetermined coordinate and at least two neighboring sub-coordinates. For example, the combination of the coordinate (x1, y1) and the sub-coordinates (x1+α1, y1+β1), (x1+α2, y1+β2) may be included. In this case, the converting device may convert the coordinate (x1, y1) into the sub-coordinates (x1+α1, y1+β1) and (x1+α2, y1+β2). The print data may have the combination of the sub-coordinate (x1+α1, y1+β1) and a first unit ink quantity, or the combination of the sub-coordinate (x1+α2, y1+β2) and the first unit ink quantity. The coordinate (for example, (x3, y3)) that was not converted into the sub-coordinate may be combined with a second unit ink quantity. In this case, the first unit ink quantity may be smaller than the second unit ink quantity.

The print data creating device may be configured separately from the printer. In this case, the print data creating device is capable of communicating with the printer by a cable or wireless. The print data creating device outputs the print data to the printer.

Alternatively, the print data creating device may be housed within the printer.

Embodiment

Figure 1:
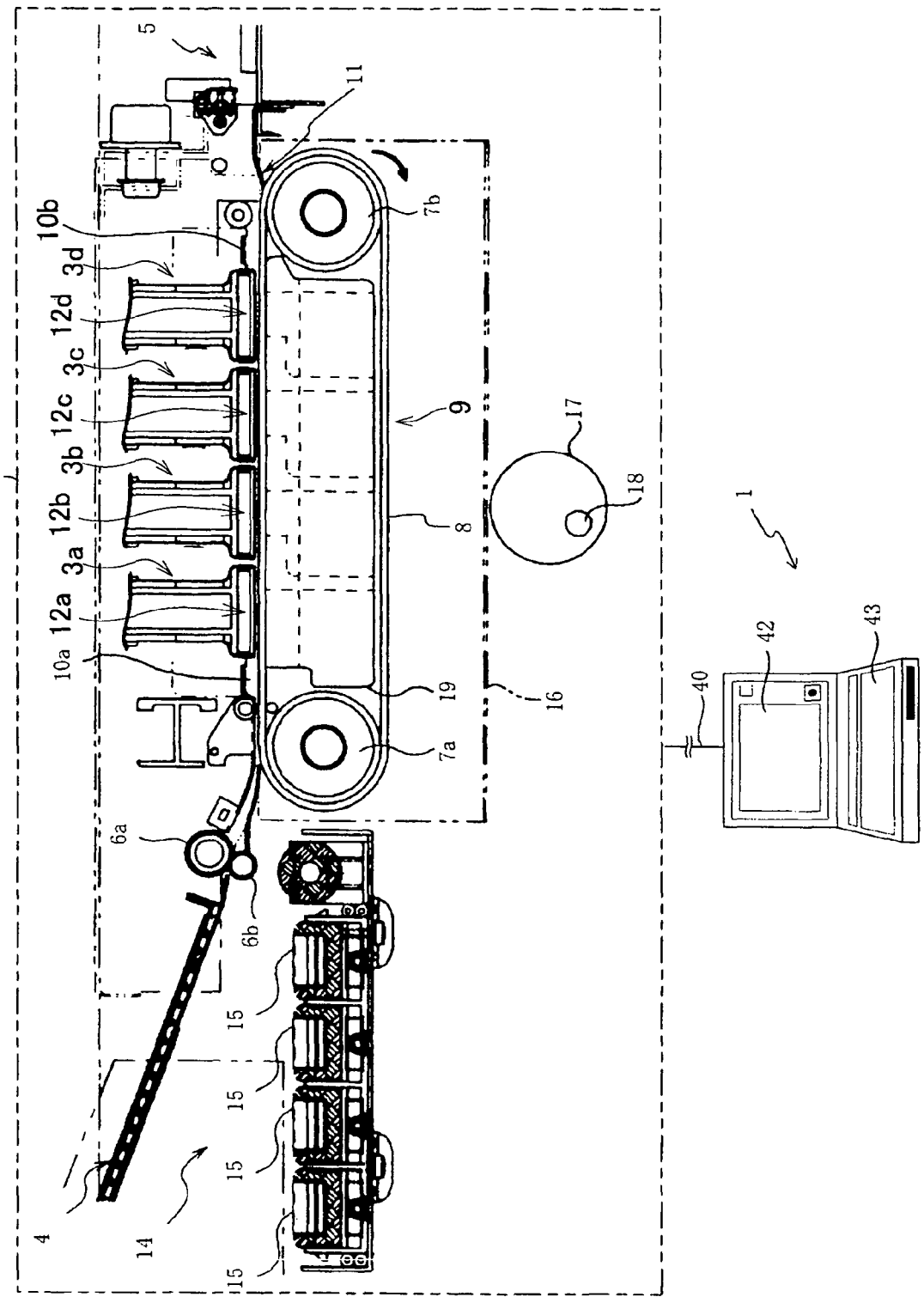
FIG. 1 shows a schematic diagram of an ink jet printer and a personal computer.

An embodiment of the present invention will be described with reference to the drawings. FIG. 1 shows a schematic diagram of a personal computer 1 and an ink jet printer 2 of the present embodiment. Below, the personal computer 1 will be referred to simply as a PC 1. Further, the ink jet printer 2 will be referred to simply as a printer 2. The PC 1 and the printer 2 are connected so as to be capable of communication by means of a communication cable 40.

The PC 1 creates print data (to be described), and outputs this print data to the printer 2. The PC 1 has an LCD 42 and a keyboard 43, etc. The LCD 42 displays images. A user can input instructions using the keyboard 43. For example, the user can instruct the printer 2 to print the image displayed on the LCD 42.

The printer 2 is a color ink jet printer. The printer 2 executes a printing operation based on the print data output from the PC 1.

Figure 2:
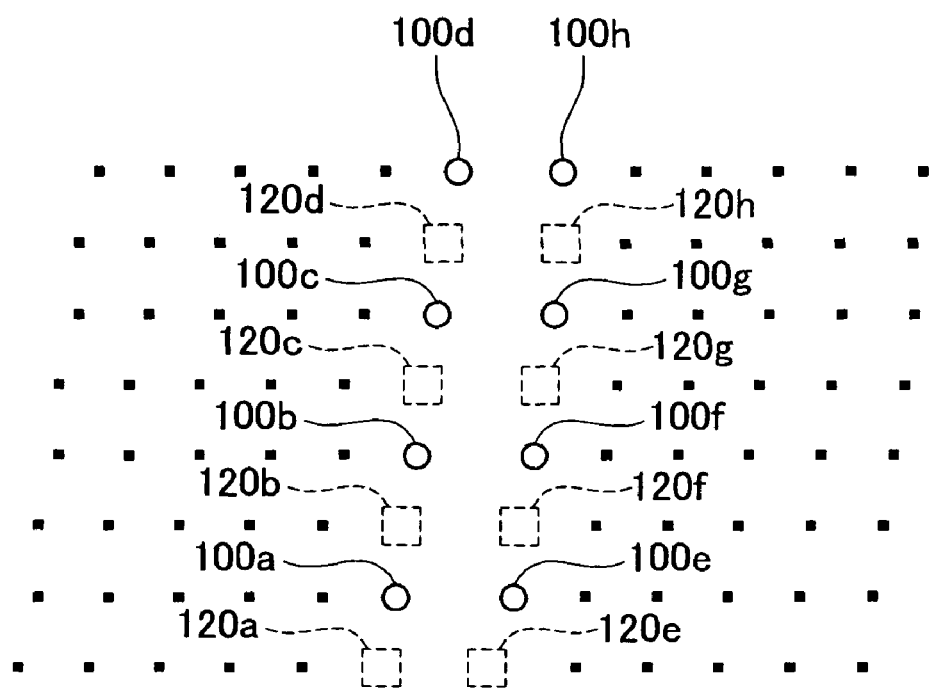
FIG. 2 shows a simplified view of nozzles and piezoelectric elements of the ink jet printer.
Figure 2:
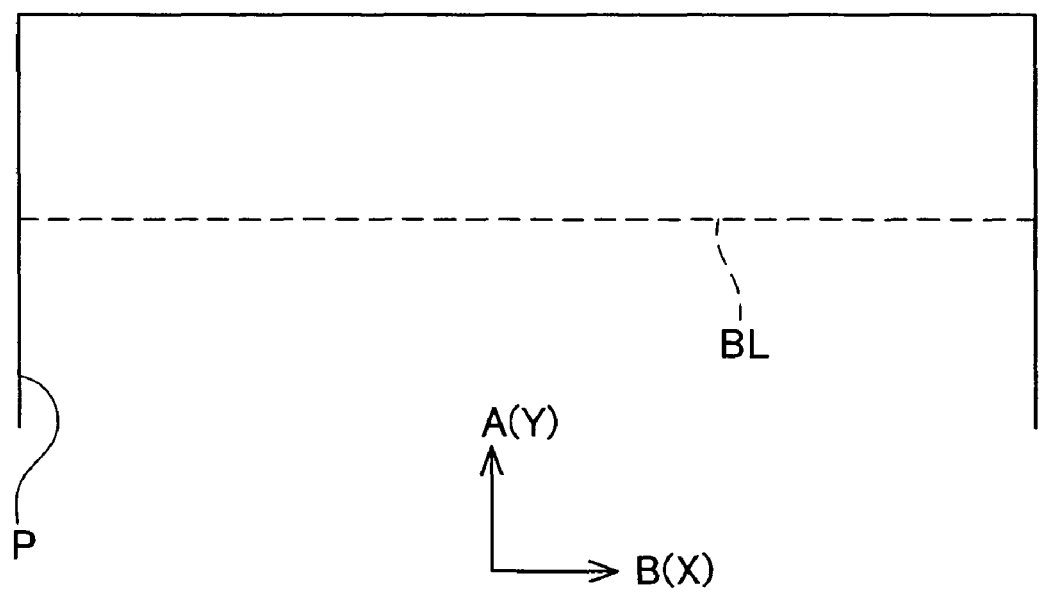

The configuration of the printer 2 will be described based on FIG. 1. The printer 2 has a paper supply portion 4 that is disposed at the left side of the figure. The paper supply portion 4 houses printing paper P which is not shown in FIG. 1, but is shown in FIG. 2. A pair of delivery rollers 6a and 6b is disposed to the right of the paper supply portion 4. The printing paper P housed in the paper supply portion 4 is gripped between the delivery rollers 6a and 6b and is delivered thereby toward the right.

A printing paper conveyer 10 is disposed to the right of the paper supply portion 4. The printing paper conveyer 10 has a pair of belt rollers 7a and 7b, a belt 8, etc. The belt 8 is wound across the belt rollers 7a and 7b. The belt roller 7a is connected to an LF motor 29 (see FIG. 3). The belt roller 7a is rotated in a clockwise direction of FIG. 1 by driving the LF motor 29. When the belt roller 7a rotates in a clockwise direction, the belt 8 and the belt roller 7b follow its rotation and rotate in a clockwise direction. When the belt 8 rotates in a clockwise direction, the printing paper P mounted on an upper face of the belt 8 is conveyed toward the right. Silicon processing has been executed on an outer peripheral face of the belt 8.

The belt rollers 7a and 7b and the belt 8 are supported by a chassis 16. The chassis 16 is mounted on a cylindrical member 17 disposed below the chassis 16. The cylindrical member 17 is capable of rotating with an axis 18 as the center, this axis 18 being located at a position removed from the center of the cylindrical member 17. When the cylindrical member 17 rotates with the axis 18 as the center, the height of an upper edge of the cylindrical member 17 changes. A guide 19 is disposed at an inner circumference of the belt 8. The guide 19 is supported by the chassis 16. The guide 19 supports the belt 8.

A pressing member 10a is disposed slightly above the belt roller 7a. The pressing member 10a pushes the printing paper P towards the belt 8 so as to prevent the printing paper P from rising off this belt 8. A pressing member 10b is disposed slightly above the belt roller 7b. The pressing member 10b also pushes the printing paper P towards the belt 8.

A separating member 11 is disposed to the right of the belt 8. The separating member 11 separates the printing paper P from the upper face of the belt 8 to which it was adhering.

A paper discharge section 5 is disposed to the right of the separating member 11. The paper discharge section 5 houses the printing paper P that has been conveyed toward the right by the belt 8.

Four ink jet heads 3a to 3d are located above the printing paper conveyer 10. The ink jet head 3a has a head main body 12a at its lower edge. The head main body 12a has a rectangular parallelopiped shape that extends in a perpendicular direction relative to the plane of the page of FIG. 1. A plurality of nozzles 100 (represented by the numbers 100a to 100h in FIG. 2) is formed in a lower face of the head main body 12a. Each nozzle 100 discharges ink droplets toward the printing paper P on the belt 8. Like the ink jet head 3a, the other ink jet heads 3b to 3d each have a head main body 12b to 12d respectively. The ink jet head 3a discharges magenta ink. The ink jet head 3b discharges yellow ink. The ink jet head 3c discharges cyan ink. The ink jet head 3d discharges black ink. In the present embodiment, the ink jet heads 3a to 3d are fixed to a printer main body (not shown). Consequently, the ink jet heads 3a to 3d do not move. That is, the printer 2 of the present embodiment is a line type ink jet printer.

A space is formed between the lower faces of the head main bodies 12a to 12d and the upper face of the belt 8. The printing paper P is transported towards the right along this space. The printing paper P passes in turn below the four head main bodies 12a to 12d. At this juncture, ink of the various colors is discharged from the nozzles of the head main bodies 12a to 12d.

The configuration of the head main body 12a will now be described in detail. Since the other head main bodies 12b to 12d have the same configuration as the head main body 12a, a detailed description thereof will be omitted. FIG. 2 shows a simplified plan view of a base face (a face in which nozzles are formed) of the head main body 12a. FIG. 2 is a diagram that has been greatly simplified, and a more complicated arrangement of nozzles is actually adopted. Details of the configuration of the ink jet head are taught in, for example, U.S. Pat. No. 4,633,268. The contents of U.S. Pat. No. 4,633,268 may be incorporated by reference into the present application.

The arrow A (a Y direction) in FIG. 2 shows a direction in which the printing paper P is conveyed. The arrow B (an X direction) is a direction orthogonal to the conveying direction A of the printing paper P. In FIG. 2, only eight nozzles 100a to 100h are shown. However, many more nozzles 100 are actually formed in the head main body 12a. Below, the number 100 will be used to represent the nozzles. In FIG. 2, eight piezoelectric elements 120a to 120h are shown. Below, the number 120 will be used to represent the piezoelectric elements. The piezoelectric elements 120 are formed within the head main body 12a. The nozzles 100 are mutually offset in the B direction. That is, the X coordinates of the nozzles 100a to 100h differ. Ink droplets are discharged from the nozzles 100 while the printing paper P is being moved in the A direction. The positional relationship of the nozzles 100 and the printing paper P does not change in the B direction. One row of dots aligned in the A direction of the printing paper P is formed by the ink droplets discharged from one nozzle (for example, 100a). Eight rows of dots may be formed by the eight nozzles 100a to 100h shown in FIG. 2.

As a further example, a straight line BL that extends in the B direction may be formed by forming one dot at the same Y coordinate by each nozzle 100. The straight line BL is shown by a dotted line in FIG. 2 because this straight line BL has not yet been formed.

Each nozzle 100 is connected with a pressure chamber (not shown). Each pressure chamber is faced by one piezoelectric element 120. Pulse signals are applied to the piezoelectric element 120, whereupon the piezoelectric element 120 deforms, and pressure of the ink in the pressure chamber is increased or decreased. The ink droplets are thus discharged from the nozzle 100. The pressure chambers, piezoelectric elements, etc. are described in detail in the aforementioned U.S. Pat. No. 4,633,268.

Returning to FIG. 1, the description of the configuration of the printer 2 will be continued. The printer 2 comprises a maintenance unit 14. The maintenance unit 14 has four caps 15a to 15d for covering the lower faces of the four head main bodies 12a to 12d. Further, the maintenance unit 14 comprises a purge mechanism (not shown).

The maintenance unit 14 waits in a position (the position shown in FIG. 1) below the paper supply portion 4 while the printer 2 is performing the printing operation. When the printing operation has not been performed for a predetermined period, a power source of the printer 2 is turned off, and the maintenance unit 14 moves to the right. The caps 15a to 15d cover the lower faces of the head main bodies 12a to 12d.

When the maintenance unit 14 is to be moved to the right from the position shown in FIG. 1, the cylindrical member 17 is rotated and the chassis 16 is thus lowered. When the chassis 16 is lowered, the pair of belt rollers 7a and 7b, the belt 8, and the guide 9 are also lowered.

Figure 3:
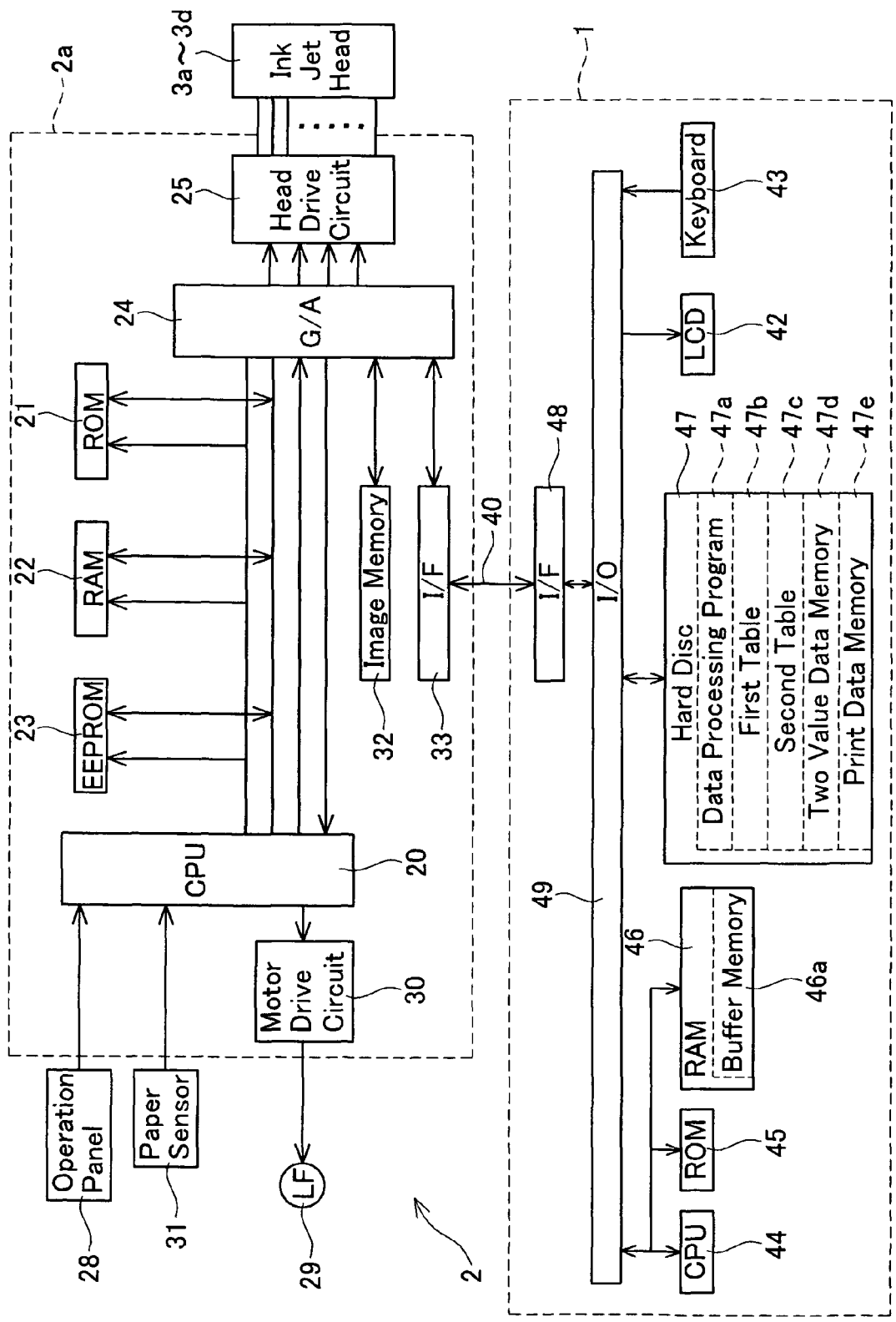
FIG. 3 shows a schematic view of the configuration of an electrical circuit of the ink jet printer and the personal computer.

Next, the configuration of electrical circuits of the PC 1 and the printer 2 will be described. FIG. 3 shows a simplification of the configuration of the electrical circuits of the PC 1 and the printer 2.

First, the configuration of the electrical circuit of the printer 2 will be described. The printer 2 has a control board 2a. The control board 2a comprises a CPU 20, a ROM 21, a RAM 22, an EEPROM 23, a gate array (G/A) 24, a head drive circuit 25, a motor drive circuit 30, an image memory 32, an interface (I/F) 33, etc. The CPU 20, ROM 21, RAM 22, EEPROM 23, and gate array 24 are all connected in a manner allowing communication via a bus line. The motor drive circuit 30 is connected to the CPU 20. The head drive circuit 25, the image memory 32, and the I/F 33 are connected to the gate array 24.

The CPU 20 is a one chip type microcomputer that executes control programs. The CPU 20 creates print timing signals and reset signals. These signals are output to the gate array 24. The ROM 21 stores the control programs to be executed by the CPU 20, as well as fixed value data. The RAM 22 temporarily stores data. The EEPROM 23 stores data.

The gate array 24 inputs the print timing signals output from the CPU 20. The gate array 24 creates signals based on print data (to be described: the print data is stored in the image memory 32) and the print timing signals. For example, the gate array 24 creates driving signals for driving the ink jet heads 3a to 3d. Further, the gate array 24 creates a conveying clock synchronized with the driving signals. The gate array 24 further creates latching signals and parameter signals. The signals created by the gate array 24 are output to the head drive circuit 25. Further, the gate array 24 stores the print data input into the interface (I/F) 33 in the image memory 32.

The head drive circuit 25 drives the ink jet heads 3a to 3d based on the signals output from the gate array 24. Specifically, the head driver circuit 25 applies pulse signals to the piezoelectric elements of the ink jet heads 3a to 3d. The timing at which the pulse signals are applied, and the number of pulse signals applied, are determined based on the signals output by the gate array 24. When one pulse signal is applied to the piezoelectric element, one ink droplet is discharged from the nozzle 100 that corresponds to this piezoelectric element. With the printer 2 of the present embodiment, the number of pulse signals for forming one dot on the printing paper P can be varied. For example, one dot can be formed by applying only one pulse signal to the piezoelectric element. In this case, a small dot is formed. Further, one dot can be formed by applying two continuous pulse signals to the piezoelectric element. In this case, one dot is formed from two ink droplets, and a medium dot is formed. One dot can be formed by applying three continuous pulse signals to the piezoelectric element. In this case, one dot is formed from three ink droplets, and a large dot is formed. In the present embodiment, in the case where one dot of the same color is formed in a predetermined area, the ratio of optical density of the large, medium, and small dots is 50:25:10. If the reflection rate of the predetermined area in which the dots are formed is R, the optical density can be defined as $D=\log_{10}(1/R)$. The optical density is generally proportional to the number of dots. The optical density when one large dot is formed in the predetermined area is similar to the optical density when two medium dots are formed in the predetermined area. Here, 'similar' includes the case where these are the same. The range of similarity is determined by experiments, etc.

The image memory 32 stores the print data (to be described). The print data is created by the PC 1. The print data output from the PC 1 is input to the I/F 33.

The motor drive circuit 30 drives the motor 29 based on the signals output from the CPU 20. The belt rollers 7a and 7b, and the belt 8 thus rotate.

The CPU 20 is connected with devices 28 and 31 that are disposed to the exterior of the control board 2a. The device 28 is an operation panel. The device 31 is a paper sensor. The user can utilize the operation panel 28 to input instructions. The instructions that have been input are fetched to the CPU 20. The paper sensor 31 detects a tip position of the printing paper P that is being supplied from the paper supply portion 4 (see FIG. 1). The paper sensor 31 outputs the detection signals to the CPU 20. The CPU 20 determines the timing at which ink will be discharged from the nozzles 100 based on the detection signals output from the paper sensor 31.

Next, the configuration of the electrical circuit of the PC 1 will be described. The PC 1 comprises the LCD 42, the keyboard 43, a CPU 44, a ROM 45, a RAM 46, a hard disc 47, an interface (I/F) 48, an I/O interface (I/O) 49, etc. The CPU 44 is connected to the ROM 45 and the RAM 46 via a data bus. The hard disc 47, LCD 42, and keyboard 43 are each connected with the I/O 49. The I/O 49 is connected with the interface 48.

The CPU 44 executes programs stored in the ROM 45 and the hard disc 47, etc. The ROM 45 stores the programs to be executed by the CPU 44. The RAM 46 temporarily stores data. The RAM 46 has a buffer memory 46a that is capable of storing the information of eight lines of sub-coordinates (the sub-coordinates will be described later). The hard disc 47 is a loadable magnetism storage device. The hard disc 47 comprises a data processing program 47a, a first table 47b, a second table 47c, a two value data memory 47d, a print data memory 47e, etc. These programs, etc. 47a to 47e are stored in a recording medium (for example, a CD-ROM) that is an accessory of the printer 2. The user installs the programs 47a to 47e on the PC 1. The hard disc 47 stores the programs 47a to 47e that have been installed.

The programs 47a to 47e will be described in detail later. Here, a simple description thereof will be given. The data processing program 47a is a program for executing processes shown in the flowcharts of FIGS. 8 to 10 (to be described). The first table 47b stores a table of FIG. 7 (to be described). The second table 47c stores a table of FIG. 14 (to be described). The two value data memory 47d stores two value data (to be described: see FIG. 11). The print data memory 47e stores the print data (to be described: see FIG. 16).

The I/F 48 is connected with the I/F 33 of the printer 2 via the communication cable 40. The PC 1 can output the print data to the printer 2 via the I/F 48 and the I/F 33. The I/O 49 communicates data between the I/F 48, the CPU 44, etc.

Figure 4:
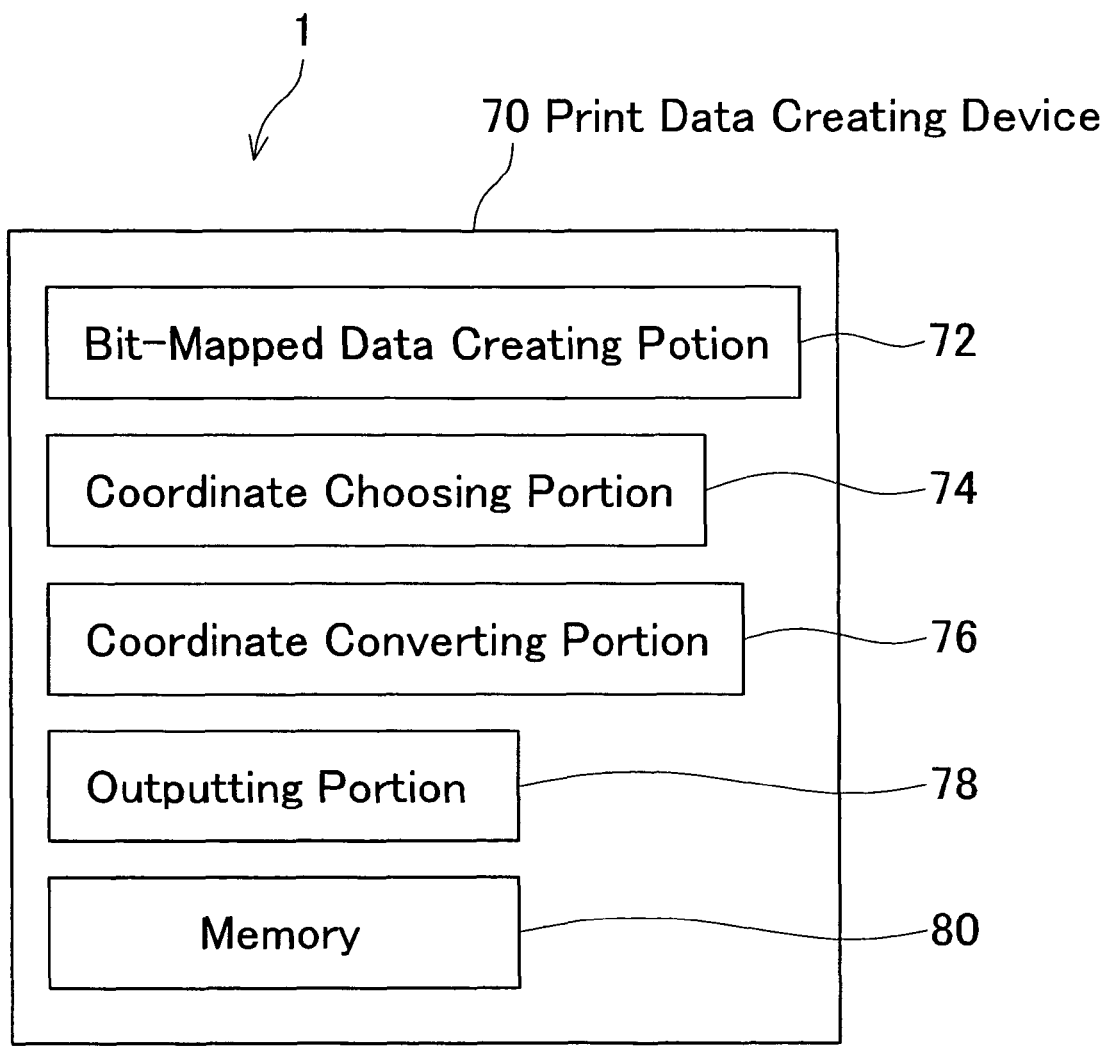
FIG. 4 shows functions realized by the personal computer.

The PC 1 realizes the functions for creating the print data utilizing the devices 42 to 49. FIG. 4 shows, in a simplified manner, the functions realized by the PC 1. FIG. 4 shows the configuration of a print data creating device 70 realized by the PC 1. The print data creating device 70 comprises a bit-mapped data creating portion 72, a coordinate choosing portion 74, a coordinate converting portion 76, an outputting portion 78, and a memory 80. The functions of the portions 72 to 80 are described later in detail using the flowcharts of FIGS. 8 to 10. Here, the functions of the portions 72 to 80 will be described simply. The bit-mapped data creating portion 72 executes the process of converting, for example, an image displayed on the LCD 42 into bit-mapped data. Further, the bit-mapped data creating portion 72 executes the process of enlarging or reducing the bit-mapped data so that it will match the resolution of the printer 2. Moreover, the bit-mapped data creating portion 72 executes the process of adjusting color information of the bit-mapped data. The coordinate choosing portion 74 chooses coordinates at which dots will be formed from all the coordinates of the bit-mapped data. The coordinate converting portion 76 converts the coordinates chosen by the coordinate choosing portion 74 into sub-coordinates. The outputting portion 78 outputs, to the printer 2, the print data that includes information showing the sub-coordinates converted by the coordinate converting portion 76. The memory 80 functions as a memory for storing the first table 47b and the second table 47c (see FIG. 3). Further, the memory 80 functions as the memory 47d for storing the two value data and the memory 47e (see FIG. 3) for storing the print data. Moreover, the memory 80 functions as the buffer 46a (see FIG. 3).

Figure 5:
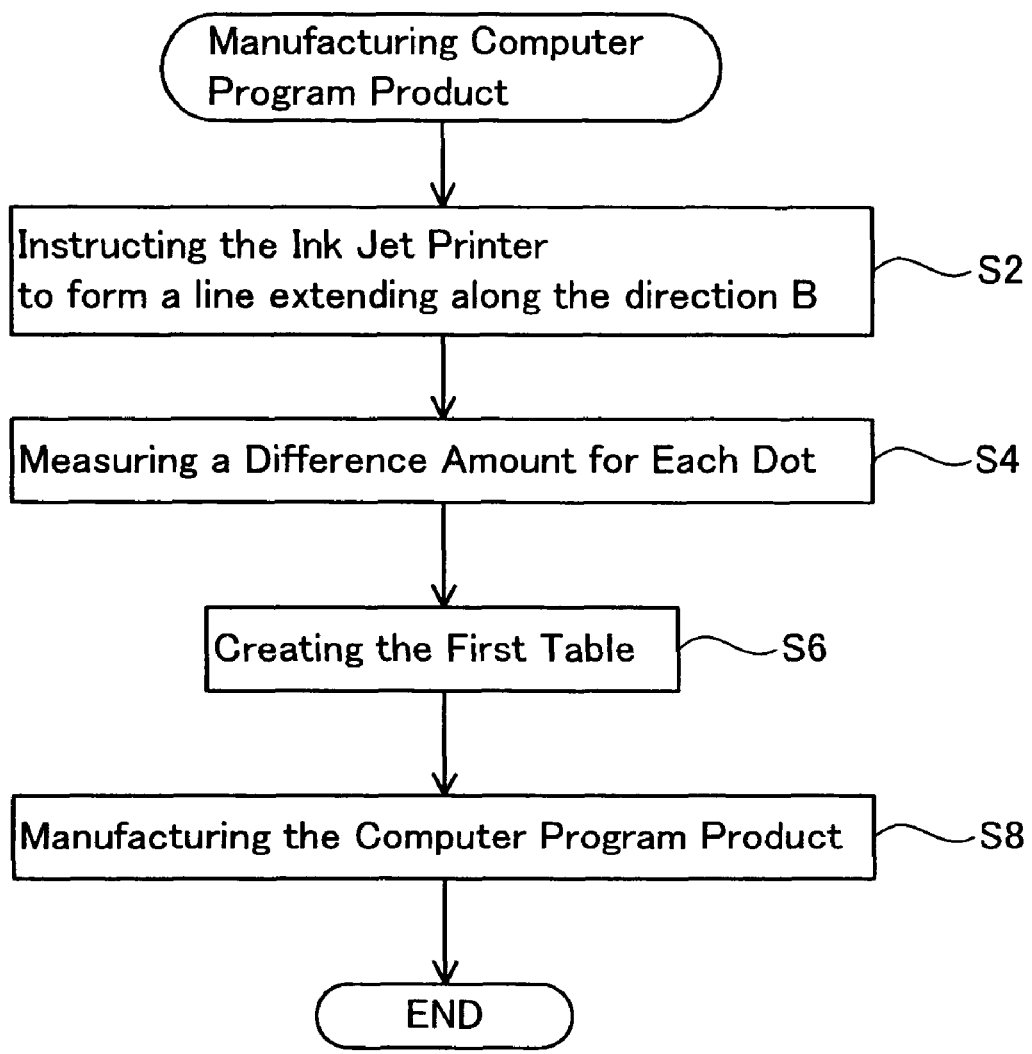
FIG. 5 shows a flowchart of a method of manufacturing a computer program product.

Next, the method will be shown of manufacturing the recording medium (the computer program product) that is installed on the hard disc 47 of the PC 1. FIG. 5 shows a flowchart of a manufacturing process.

When the ink jet printer 2 has been manufactured, the straight line BL (see FIG. 2) extending in the B direction is formed in the printer 2 (S2). This process is executed for each of the four ink colors. That is, the process of S2 is executed using each of the ink colors cyan, magenta, yellow, and black. When the cyan straight line BL is formed, each nozzle 100 of the head main body 12a forms one dot. Similarly, when the straight lines BL of the other colors are formed, each nozzle 100 of the head main bodies 12b to 12d forms one dot.

The process of S2 is executed by supplying the printer 2 with print data that instructs the formation of the straight line BL. This print data includes information instructing dots to be formed at, for example, the coordinates (x, y), (x+s, y), (x+2s, y), (x+3s, y) . . . .

Figure 6:
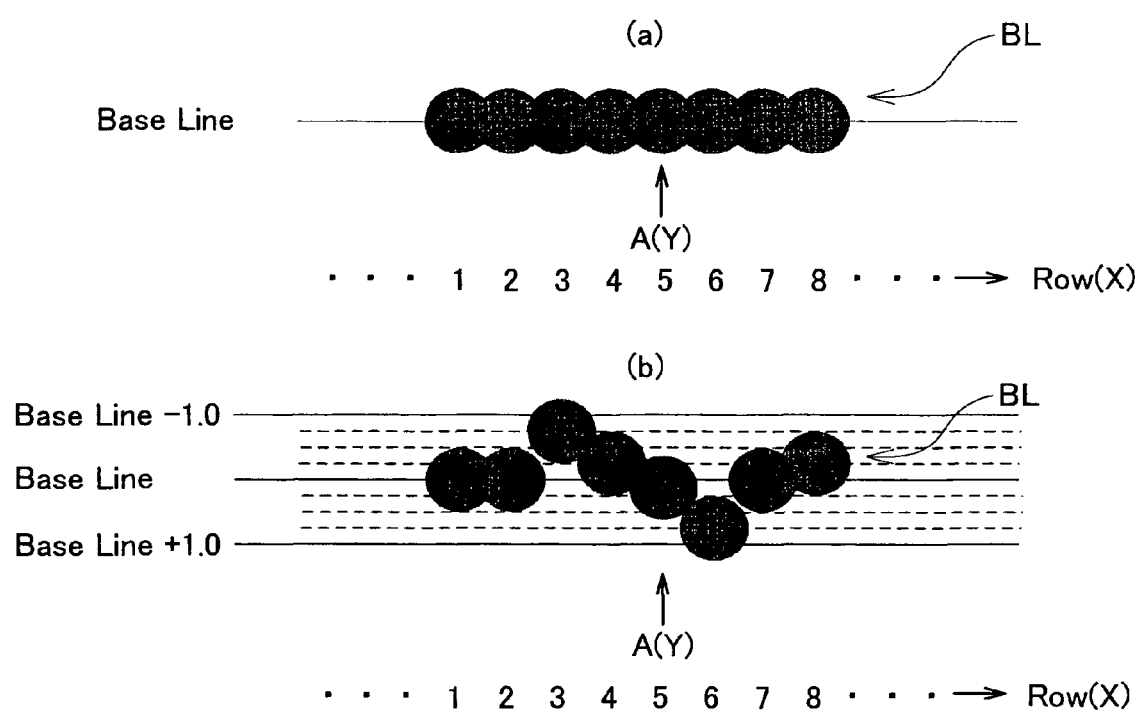
FIG. 6 (a) shows dots formed along a base line.

Next, a difference amount between each of the dots and a base line is measured (S4). This step is performed for each of the straight lines BL of cyan, magenta, yellow, and black. The base line is a hypothetical line showing the position at which the straight line BL should be formed by the printer 2. FIG. 6 (a) shows the base line and a part of the straight line BL formed in S2. In FIG. 6 (a), the centers of the dots (large dots) are aligned in a row on the base line, and could be termed an ideal straight line BL. Since eight dots are formed in FIG. 6 (a), eight nozzles are required. In FIG. 6 (a), X coordinates of the nozzles for forming the eight dots are shown by the numbers 1 to 8. FIG. 6 (b) shows dots that have been formed in positions displaced from the base line. FIG. 6 (b) shows three straight lines which are the base line, the base line +1.0, and the base line −1.0. The space between the base line and the base line +1.0 is equivalent to the space between the base line and the base line −1.0. When a large dot is formed on the base line and a large dot is formed at the base line +1.0 (or at the base line −1.0), these two large dots make contact. That is, the space between the base line and the base line +1.0 (or the base line −1.0) is equivalent to a diameter of the large dot.

The arrow A in the figure shows the conveying direction of the printing paper P. The dots formed by the nozzles which have the X coordinates 3, 4, and 8 are formed above the base line. Further, the dots formed by the nozzles which have the X coordinates 5 and 6 are formed below the base line. The dots formed by the nozzles which have the X coordinates 1, 2, and 7 are formed on the base line.

When the straight line BL shown in FIG. 6 (a) is formed, the difference amount between each dot and the base line in S4 is specified as zero. Furthermore, when the straight line BL shown in FIG. 6 (b) is formed, the difference amount between the dot and the base line in S4 is specified for each nozzle. In the present embodiment, the difference amount is a minus amount when the dots are formed above the base line, and the difference amount is a plus amount when the dots are formed below the base line. For example, in the case of the nozzle which has the X coordinate 3, the difference amount between the dot and the base line can be specified as −0.7. As another example, in the case of the nozzle which has the X coordinate 5, the difference amount between the dot and the base line can be specified as +0.1.

In the present embodiment, the process of S4 is executed manually. For example, the process can be executed as follows. (1) the printing paper P on which the straight line BL has been formed is read by a scanner (for example, a CCD). (2) The image that has been read is shown on a display. It is preferred that this is enlarged and displayed. The dots that comprise the straight line BL are shown on the display, and the X coordinates of the nozzles and the base lines are shown on the display. In this case, the contents in the example of FIG. 6 (b) are shown. (3) The difference amount between the base line and the dot is estimated by eye for each dot (i.e. for each nozzle). Although the process of S4 is executed manually in the present embodiment, the process of S4 may equally be executed utilizing a machine.

The process of S4 is executed for each of the four colors. The difference amount is measured for all the nozzles 100 of the head main body 12a. Similarly, the difference amount is measured for all the nozzles 100 of the head main bodies 12b to 12d. In the present embodiment, there is a difference amount only in a part of the nozzles 100 of the head main body 12a that corresponds to the cyan ink. That is, the straight lines BL formed by the head main bodies 12b to 12d are formed on the base line. The difference amount of the nozzles of the head main bodies 12b to 12d is zero.

The process of S6 is executed after the process of S4 has been executed. In S6, the first table 47b which has combinations of the X coordinates of the nozzles and the difference amounts is created. FIG. 7 shows an example of contents stored in the first table 47b. FIG. 7 stores the difference amounts for the nozzles 100 of the head main body 12a that corresponds to the cyan ink. The contents of FIG. 7 correspond to the contents of FIG. 6 (b). That is, the difference amount for the X coordinates 1, 2, and 7 shown in FIG. 6 (b) is zero. Consequently, the difference amount for the X coordinates 1, 2, and 7 in FIG. 7, also, is zero. Further, in FIG. 6 (b), the difference amount is −0.7 for the X coordinate 3. The difference amount is −0.2 for the X coordinate 4. The difference amount is +0.1 for the X coordinate 5. The difference amount is +0.7 for the X coordinate 6. The difference amount is −0.3 for the X coordinate 8. Difference amounts corresponding to this are shown in FIG. 7.

In the process of S6, the first tables 47b that correspond to each of the four head main bodies 12a to 12d are formed. In the present embodiment, the first tables 47b that correspond to the head main bodies 12b to 12d all have a difference amount of zero for each of the nozzles.

The process of S8 is executed after the process of S6 has been executed. In the process of S8, a program is loaded onto a recording medium such as a CD-ROM or the like. Here, the data processing program 47a, the first table 47b, and the second table 47c, all shown in FIG. 3, are loaded onto the recording medium. The first table 47b formed in S6 is loaded onto the recording medium. The second table 47c is fixed information, and is not a table set in accordance with the processes of S2 to S6. An example of the contents stored in the second table 47c is shown in FIG. 14. Combinations of the range of the difference amount and sub-coordinates are stored in the second table 47c. That is, sub-coordinates for adjusting the difference amount of the nozzles can be stored. The second table 47c may be formed when the steps of S6 and S8 are executed. Alternatively, the second table 47c may be formed in advance. The contents of the second table 47c will be described in detail later.

Moreover, in S8, a program is written for maintaining storage areas of the two value data memory 47d, the print data memory 47e, and the buffer memory 46a (all in FIG. 3) in the PC 1.

The computer program product (for example, a CD-ROM) is completed by executing the above processes S2 to S8, this computer program product including instructions for ordering the PC 1 to form the print data. The completed computer program product is an accessory of the printer 2.

Figure 8:
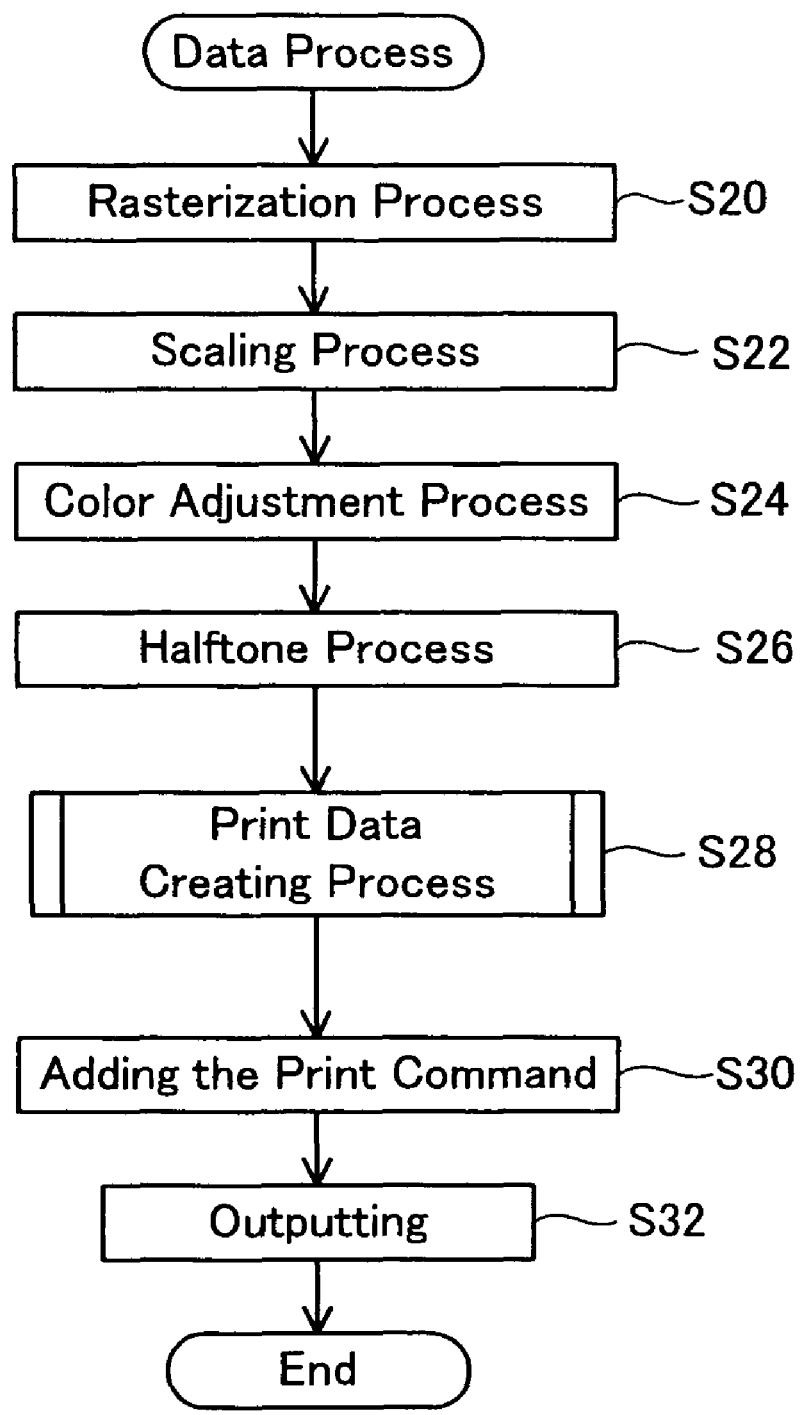
FIG. 8 shows a flowchart of a data process.

The data processes executed by the PC 1 will be described with reference to FIGS. 8 to 10. FIG. 8 shows a flowchart of the processes for creating and outputting the print data. The data process is executed by the print data creating device 70 of FIG. 4.

The user can designate desired image data (this includes text data) and instruct printing the image data. The user can input the instruction using the keyboard 43 (see FIG. 3). When the instruction is input, the data processing program 47a shown in FIG. 3 is executed, and the processes shown in FIG. 8 are thus executed.

The print data creating device 70 first executes a rasterization process (S20) on the image data instructed by the user. The image data is thus converted into bit-mapped data. The bit-mapped data comprises a plurality of pixel data. Each pixel datum is a combination of a coordinate obtained by subdividing the image data into a matrix shape, and color information at this coordinate. The color information is represented by color density (this may be termed a gradation value) for each of the four colors (cyan (C), magenta (M), yellow (Y), and black (K)). As a result, one pixel datum includes a combination of one coordinate, C color density, M color density, Y color density, and K color density. In the case where image data in which bit-mapped data has already been created is to be printed, the process of S20 can be skipped.

Next, the bit-mapped data created in S20 is enlarged or reduced (S22). The bit-mapped data is thus rewritten to match the resolution of the printer 2. In the present embodiment, the bit-mapped data is converted to a resolution of 600 dpi (dots per inch)×600 dpi. Here, the coordinates before rewriting are rewritten into coordinates that match the aforementioned resolution.

Performing the process of S22 creates the need to adjust the color information of the pixel data that has been rewritten. The color information of the pixel data that has been rewritten must be determined such that, as far as possible, there is no loss of the color information of the pixel data from prior to rewriting. The process of S24 is executed to achieve this. The contents of the process of S24 are taught in, for example, U.S. Pat. No. 6,757,076. The contents of U.S. Pat. No. 6,757,076 may be incorporated by reference into the present application.

When the process of S24 is completed, the bit-mapped data in which the color information has been adjusted is created. A plurality of pixel data is included in this bit-mapped data. Each pixel datum includes a combination of one coordinate, cyan color density, magenta color density, yellow color density, and black color density.

The processes of S20 to S24 are executed by the bit-mapped data creating portion 72 of FIG. 4.

Next, a halftone process is executed (S26). Here, the coordinates at which the dots will be formed are chosen from the bit-mapped data. This process is executed based on the color information (the color density of the four colors) of the pixel data. An example of the process of S26 is given below. The color density of each of the four colors included in the color information of the pixel datum is compared with a predetermined threshold by the print data creating device 70. For example, in the case where the color density is represented by any density between 0 and 255, 128 can be adopted as the threshold. If, for example, the cyan color density included in the pixel datum is 200, the coordinate (for example, (x1, y1)) included in that pixel datum is chosen in S26. In this case, information in which the chosen coordinate (x1, y1) and cyan are matched is stored. Specifically, the combination of the coordinate (x1, y1), cyan, and a flag '1' is stored in the two value data memory 47d of FIG. 3. As another example, if the magenta color density combined with the coordinate (x1, y1) is 100, the combination of the coordinate (x1, y1), magenta, and a flag '0' is stored. Below, the flag '1' may represent the flag ON, and the flag '0' may represent the flag OFF. If at least two color densities included in one pixel datum exceed the threshold, the flag is turned ON for the color that has the greatest color density, and the flag is turned OFF for the other colors. For example, if one pixel datum includes the combination of the coordinate (x1, y1), cyan color density of 200, magenta color density of 100, yellow color density of 150, and black color density of 50, then the following combinations are created: the combination of the coordinate (x1, y1), cyan, and the flag '1'; the combination of the coordinate (x1, y1), magenta, and the flag '0'; the combination of the coordinate (x1, y1), yellow and the flag '0'; and the combination of the coordinate (x1, y1), black, and the flag '0'. Furthermore, if at least two color densities included in one pixel datum exceed the threshold, the flags corresponding to two colors may both be turned ON.

If the gradation value of all the four colors combined with one coordinate is smaller than 128, all the four flags corresponding to that coordinate are turned OFF. In this case, that coordinate has not been chosen in S26.

When the above process has been executed on all the pixel data, and the coordinates at which the dots are to be formed have been chosen, the process proceeds to S28. Below, one item of information corresponding to one flag (the information of the combination of coordinate, color, and '1' or '0') is also termed pixel datum. Consequently, when the process of S26 is executed, a plurality of pixel data is created. The plurality of pixel data created in S26 is termed two value data.

The process described above is one example of the halftone process, and this example does not necessarily have to be executed. For example, the error diffusion method or the dither method may equally well be utilized. These methods are taught in, for example, U.S. Pat. Nos. 4,760,460 and 4,521,805. The contents of U.S. Pat. Nos. 4,760,460 and 4,521,805 may be incorporated by reference into the present application.

Moreover, the halftone process is not restricted to having the two values of the flag being on or off. The halftone process can be quantized to three or more. For example, the process can be quantized to four values: large dot on, medium dot on, small dot on, and dot off.

The halftone process of S26 is executed by the coordinate choosing portion 74 of FIG. 4.

FIG. 11 shows an example of the two value data. This two value data corresponds to cyan. The two value data corresponding to the other colors is created in the same way in S26. Below, the left-right direction of FIG. 11 is an X axis direction (Row) and the up-down direction of FIG. 11 is a Y axis direction (Line). The X axis direction of FIG. 11 corresponds to the X axis direction of other figures, and the Y axis direction of FIG. 11 corresponds to the Y axis direction of other figures. The row numbers of FIG. 11 correspond to the numbers (the X coordinates of the nozzles) of FIG. 7.

As shown in FIG. 11, each pixel datum of the two value data stores '1' or '0'. For example, '1' is stored corresponding to the coordinate (1, M), and '0' is stored corresponding to the coordinate (1, M+1). In the present embodiment, a distance (1) between the Y coordinate (M) and the Y coordinate (M+1) of the two value data is equivalent to a distance (4t; See FIG. 13 for t) between two adjoining base lines of FIG. 6 (b).

Below, one line of data of the two value data is termed one line data. In FIG. 11, three items of one line data are shown: the line M, the line M+1, and the line M+2.

When the halftone process of S26 of FIG. 8 has been completed, the process proceeds to S28. The process of S28 is executed by the coordinate converting portion 76 of FIG. 4. The print data creating process of S28 will be described with reference to FIGS. 9 and 10. FIGS. 9 and 10 show flowcharts of the print data creating process of S28. Here, the process that is executed on the basis of the two value data corresponding to cyan is described. Similar processes are executed for the other colors.

Figure 12:
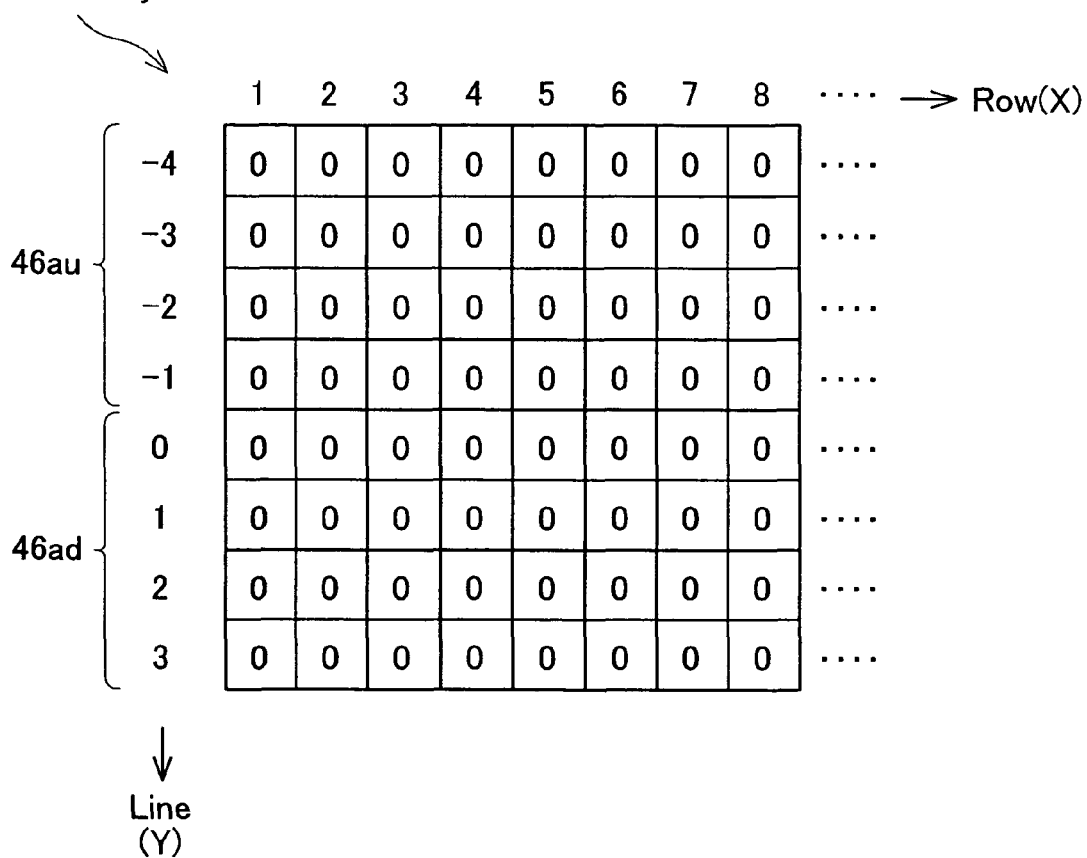
FIG. 12 shows contents stored in a buffer memory.

In the print data creating process, the buffer memory 46a (see FIG. 3) is first initialized (S50). FIG. 12 shows an example of the buffer memory 46a that has been initialized. The buffer memory 46a can store combinations of the sub-coordinates (to be described) and scale of dots. The buffer memory 46a can store information about the sub-coordinates obtained from one line data. In the present embodiment, information of eight lines of sub-coordinates is obtained from one line data. This point will be described in detail later. Below, the four lines from '−4' to '−1' in FIG. 12 will be termed an upper storage region 46au. The four lines from '0' to '3' will be termed a lower storage region 46ad. The row numbers of the buffer memory 46a (shown by 1 to 8 in FIG. 12) correspond to the row numbers of the two value data (see FIG. 11).

Figure 9:
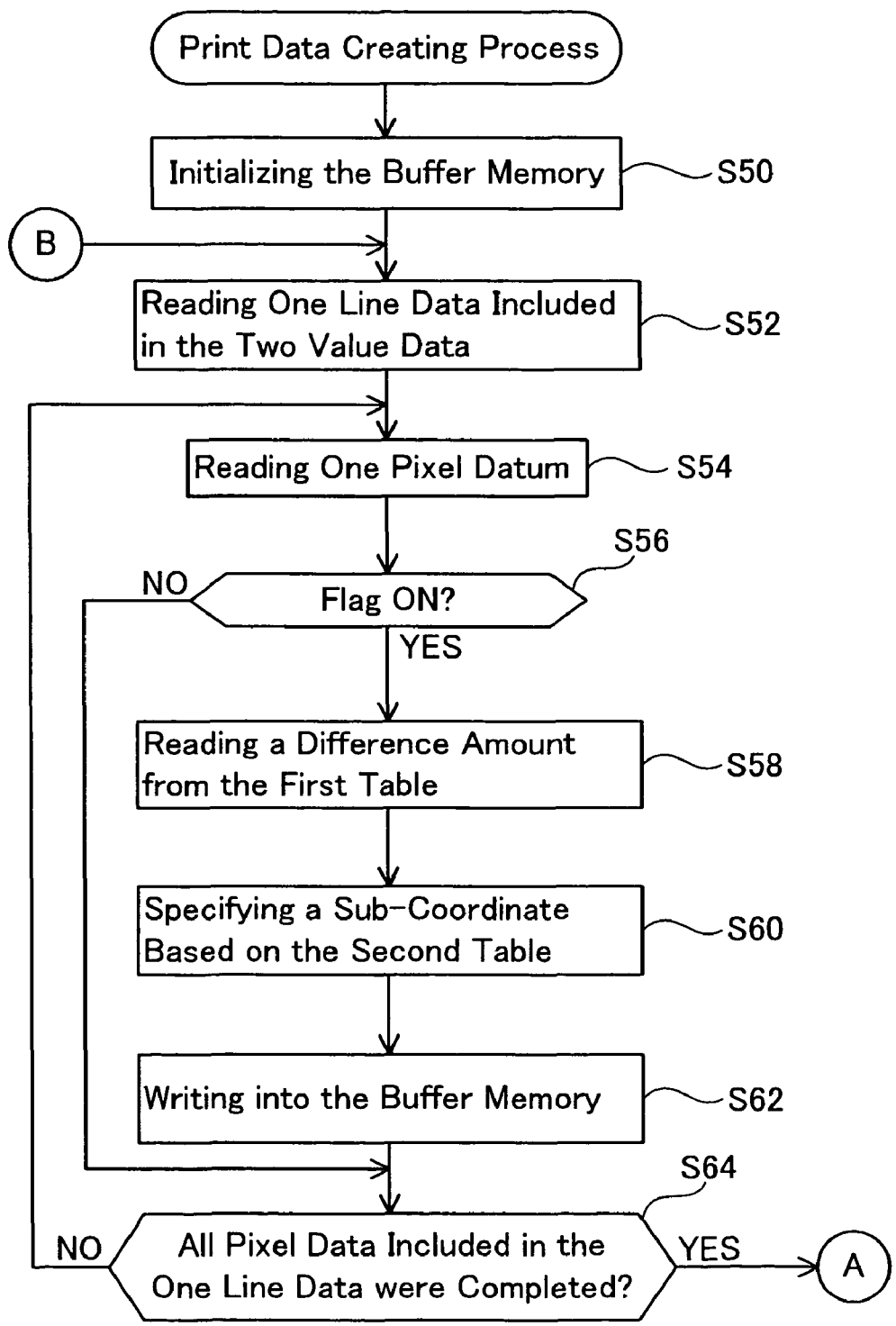
FIG. 9 shows a flowchart of a print data creating process.

When the buffer memory 46a has been initialized in S50 in FIG. 9, the one line data included in the two value data (see FIG. 11) is read (S52). For example, the one line data for the line M is read. Next, the one pixel datum included in the one line data that was read in S52 is read (S54). In the example of FIG. 11, the pixel datum having the combination of the coordinate (1, M) and the flag '1' is read. Then, it is determined whether the flag is ON of the pixel datum read in S54 (S56). For example, in the case where the pixel datum read in S54 has the combination of the coordinate (1, M) and the flag '1', YES is determined in S56. If S56 is YES, the process proceeds to S58. In the case where, for example, the pixel datum read in S54 has the combination of the coordinate (2, M) and the flag '0', NO is determined in S56. If S56 is NO, the process proceeds to S64.

When YES was determined in S56, the difference amount is read (S58) from the first table 47b (see FIG. 7). The first table 47b is retrieved by using the X coordinate of the coordinate read in S54 as a key. The difference amount can thus be specified. In FIG. 7, for example, there is the combination of the X coordinate (1) and the difference amount (0). Consequently, if the combination of the coordinate (1, M) and the flag '1' is read in S54, a difference amount (0) is specified in S58. Further, in FIG. 7, there is the combination of the X coordinate (4) and the difference amount (−0.2). Consequently, if the combination of the coordinate (4, M) and the flag '1' is read in S54, a difference amount (−0.2) is specified in S58.

When the difference amount has been read in S58, the sub-coordinates are specified (S60) based on the second table 47c. The sub-coordinates are coordinates in the neighborhood of the coordinates of the pixel data read in S54.

Figure 13:
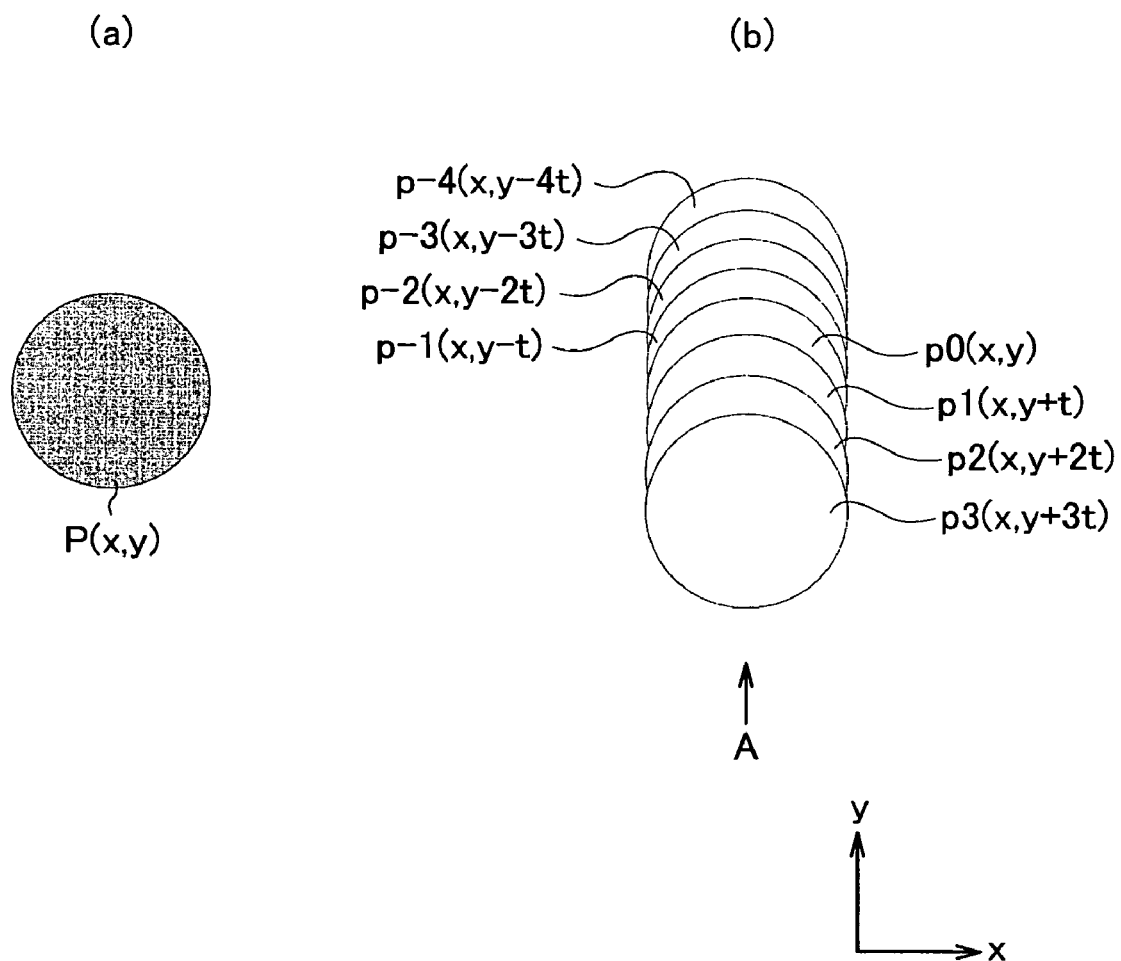
FIG. 13 (a) shows one coordinate.

The sub-coordinates will be described with reference to FIG. 13. FIG. 13 (a) shows a coordinate P (x, y) included in one pixel datum. In FIG. 13, one coordinate is represented by one dot. FIG. 13 (b) shows eight sub-coordinates p−4 to p3 that correspond to the coordinate (x, y). The direction A in the figure is the direction in which the printing paper P moves relative to the ink jet heads 3a to 3d. The sub-coordinate p0 (x, y) of the present embodiment is the same as the coordinate P (x, y) included in the pixel datum. The sub-coordinates p−4 to p3 are aligned in the direction in which the printing paper P moves relative to the ink jet heads 3a to 3d. A small number is adopted as 't' shown in FIG. 13 (b). As a result, if dots were to be formed at all of the sub-coordinates p−4 to p3, the major part of each dot would overlap with the adjoining dot. In the present embodiment, t is equivalent to a length one eighth the distance between the base line −1.0 and the base line +1.0 (see FIG. 6 (b)). Consequently, if the distance between the base line −1.0 (or the base line +1.0) and the base line is 1, then t is 0.25. The length t is equivalent to one fourth the diameter of one large dot.

The difference amounts are divided into fifteen ranges in the second table 47c as shown in FIG. 14. Further, the numbers −4 to 3 correspond to the sub-coordinates p−4 to p3. Either an empty column, or 2 or 3 are shown in the cells specified by one range of the difference amount and one sub-coordinate. The number 2 in the cell corresponds to a medium dot, and the number 3 in the cell corresponds to a large dot. The second table 47c stores a plurality of combinations of the range of difference amount, the sub-coordinate, and the scale of the dot. For example, the combination of the range of the difference amount (−0.5625 to −0.4375), the sub-coordinate p2 and a large dot is stored. Moreover, the information for small dots may also be stored in the table of FIG. 14. In that case, the number '1' may be adopted to correspond to the small dot.

In S60 of FIG. 9, a combination of the sub-coordinate and the scale of the dot is specified based on the difference amount read in S58 and the second table 47c. For example, if the difference amount (−0.2) was read in S58, the combination of the sub-coordinate p1 and a large dot is specified. If the difference amount read in S58 was zero, the combination of the sub-coordinate p0 and a large dot is specified. As shown in FIG. 13, the sub-coordinate p0 is a coordinate that is identical with the coordinate that has been read. In S60, two sub-coordinates may be specified from one difference amount. For example, if the difference amount (+0.1) was read, the combination of the sub-coordinate p−1 and a medium dot, and the combination of the sub-coordinate p0 and a medium dot are specified.

Next, the information specified in S60 is written into the buffer memory 46a (see FIG. 3) (S62). The process of S62 will be described with reference to FIG. 15. FIG. 15 (a) to (f) shows a time sequence of changes of contents stored in the buffer memory 46a. In FIG. 15 (a) to (f), the numbers '−4' to '3' that are aligned in a vertical direction correspond to the sub-coordinates p−4 to p3. Furthermore, the numbers '1' to '8' that are aligned in a horizontal direction correspond to the row numbers (the X coordinates of the nozzles) of the two value data.

As an example, the case will be described where the difference amount (−0.2) was read in S58. In this case, the combination of the sub-coordinate p−1 and '3' (a large dot) is specified in S60. In this case, '3' is written into the cell that corresponds with the row number 4 and the sub-coordinate p1. In FIG. 15, '3' has been written into the cell that corresponds with the row number 4 and the sub-coordinate p1. Further, as an example, the case will be described where the difference amount (+0.1) was read in S58. In this case, a combination of the sub-coordinate p−1 and '2' (a medium dot) and the combination of the sub-coordinate p0 and '2' (a medium dot) are specified in S60. In this case, '2' is written into the cell that corresponds with the row number 5 and the sub-coordinate p0, and '2' is written into the cell that corresponds with the row number 5 and the sub-coordinate p−1.

When the process of S62 of FIG. 9 has been completed, the process proceeds to S64. When NO was determined in S56, also, the process proceeds to S64. Since the processes from S58 to S62 were skipped when NO was determined in S56, all the eight cells (the eight vertically aligned cells) for one row number in the buffer memory 47a remain at zero.

In S64, it is determined whether the processes S54 to S62 were executed for all the pixel data included in the one line data read in S52. When YES is determined, the process proceeds to S80 of FIG. 10. When NO is determined in S64, the process returns to S64 and one pixel datum is read.

FIG. 15 (a) shows the contents stored in the buffer memory 46a when the processes S54 to S62 have been executed for all the pixel data included in the one line data of the line M shown in FIG. 11. In FIG. 15 (a), the numbers 2 or 3 have been stored in six cells.

Next, the processes after S80 will be described with reference to FIG. 10. In S80, the values in the upper storage region 46au (−4 to −1) of the buffer memory 46a are written into the print data memory 47e. FIG. 16 shows an example of the print data memory 47e. The row numbers of the print data memory 47e (1 to 8 are shown in FIG. 16) correspond to the row numbers of the FIG. 15. The left-right direction of the print data memory 47e is an X axis direction, and the up-down direction is a Y axis direction. A combination of the X coordinate and the Y coordinate can be represented by each cell in the print data memory 47e. In FIG. 16, the X coordinates 1 to 8 are shown. Further, the Y coordinates M −4t to M+3−t are shown. As described above, t is 0.25. As a result, the Y coordinate (M+1−4t) is equivalent to the Y coordinate (M). The values in the upper storage region 46au (−4 to −1) of FIG. 15 (a) are written into a block D1 of the print data memory 47e. By this process, the information of the sub-coordinates p−4 to p−1 of the one line data of the line M is written into the print data memory 47e. At this stage, the information of the sub-coordinates p0 to p3 of the one line data of the line M is not written into the print data memory 47e.

Next, the stored contents of the lower storage region 46ad of the buffer memory 46a are shifted (S82), while maintaining their sequence, to the upper storage region 46au. Specifically, the values of the cells of the line 0 are shifted to the cells of the line −4, the values of the cells of the line 1 are shifted to the cells of the line −3, the values of the cells of the line 2 are shifted to the cells of the line −2, and the values of the cells of the line 3 are shifted to the cells of the line −1. FIG. 15 (b) shows how the lower storage region 46ad of FIG. 15 (a) has been shifted to the upper storage region 46au by executing the process of S82.

When the process of S82 has been executed, the lower storage region 46ad of the buffer memory 46a is initialized (S84). In FIG. 15 (b), all of the cells in the lower storage region 46ad have been initialized to zero.

Next, it is determined whether all the one line data of the two value data (see FIG. 11) has been processed (S86). If NO is determined, the process returns to S52 of FIG. 9, and other one line data is read. If the process has been completed for the one line data of the line M, the one line data of the line M+1 is read.

FIG. 15 (c) shows the buffer memory 46a when the processes S54 to S62 have been executed for the one line data of the line M+1. In FIG. 15 (c), the information for the case where the processes have been performed for the one line data of the line M+1 is added to the buffer memory 46a of FIG. 15 (b). The information of the sub-coordinates p0 to p3 for the case where the processes have been performed for the one line data of the line M+1 is stored in the lower storage region 46ad of FIG. 15 (c). The upper storage region 46au of the buffer memory 46a stores a combination of the information of the sub-coordinates p0 to p3 when the processes have been performed for the one line data for the line M, and the information of the sub-coordinates p−4 to p−1 when the processes have been performed for the one line data of the line M+1. For example, the '3' in the cell specified by the sixth line and the sub-coordinate p−3 in the upper storage region 46au of FIG. 15 (c) is the content stored in the case where the processes have been performed for the one line data of the line M+1. The other cells of '2' or '3' in the upper storage region 46au are information of the sub-coordinates p0 to p3 when the processes have been performed for the one line data of the line M.

The contents stored in the upper storage region 46au of FIG. 15 (c) are written into a block D2 (see FIG. 16) of the print data memory 47e (S80). The information of all the sub-coordinates p−4 to p3 of the one line data of the line M is thus written. Further, the information of the sub-coordinates p−4 to p−1 of the one line data of the line M+1 is written.

As described above, the buffer memory 46a stores only the information of the eight lines worth of sub-coordinates. That is, all the information of the sub-coordinates corresponding to all the one line data can not be stored. Consequently, the Y coordinates of the sub-coordinates cannot be specified based only on the information of the buffer memory 46a. For example, the X coordinate can be specified from the information '2' of the sub-coordinate p−1 of the fifth row of FIG. 15 (a), but the Y coordinate cannot be specified.

The sub-coordinates corresponding to one line data are stored by writing the information of the buffer memory 46a into the blocks of the print data memory 47e. For example, the Y coordinate (M−t) can be specified by writing the information '2' of the sub-coordinate p−1 of the fifth row of FIG. 15 (a) into the block D1 of the print data memory 47e. The information stored in the buffer memory 46a could be said to be adjustment amounts for converting the Y coordinates of the coordinates included in one line data. The action of writing the information of the buffer memory 46a into the print data memory 47e is equivalent to the action of adding the adjustment amount to the coordinate chosen in S26 of FIG. 8 and thus converting it into the sub-coordinate. The action of specifying the sub-coordinate in S60 of FIG. 9 is equivalent to the action of specifying the adjustment amount corresponding to the difference amount. The adjustment amount that has been specified is stored in the buffer memory 46a. By means of writing the information from the buffer memory 46a into the print data memory 47e, the adjustment amount is added to the coordinate read in S54, thus the coordinate read in S54 is converted into the sub-coordinate.

When the difference amount corresponding to the coordinate read in S54 is zero, a sub-coordinate which is the same as the coordinate is specified in S60. That is, it could be said that the coordinate corresponding to the nozzle having the difference amount of zero is not converted to a differing sub-coordinate.

FIG. 15 (d) shows the results when the processes of S82 to S84 have been performed on the buffer memory 46a of FIG. 15 (c). The information of the sub-coordinates p0 to p3 when the processes of S54 to S64 have been performed for the one line data of the line M+1 is stored in the upper storage region 46au of the buffer memory 46a.

FIG. 15 (e) shows the buffer memory 46a when the processes of S54 to S62 have been performed for the data of the line M+2. The upper storage region 46au of FIG. 15 (e) includes the information of the sub-coordinates p0 to p3 when the processes of S54 to S62 have been performed for the one line data of the line M+1, and the information of the sub-coordinates p−4 to p−1 when the processes of S54 to S62 have been performed for the one line data of the line M+2. The lower storage region 46ad of FIG. 15 (e) includes the information of the sub-coordinates p0 to p3 when the processes of S54 to S62 have been performed for the one line data of the line M+2. The contents stored in the upper storage region 46au of FIG. 15 (e) are written into a block D3 of the print data memory 47e (S80).

FIG. 15 (f) shows the results when the processes of S82 to S84 have been performed on the buffer memory 46a of FIG. 15 (e). The information of the sub-coordinates p0 to p3 when the processes of S54 to S62 have been performed for the one line data of the line M+2 is stored in the upper storage region 46au.

Figure 10:
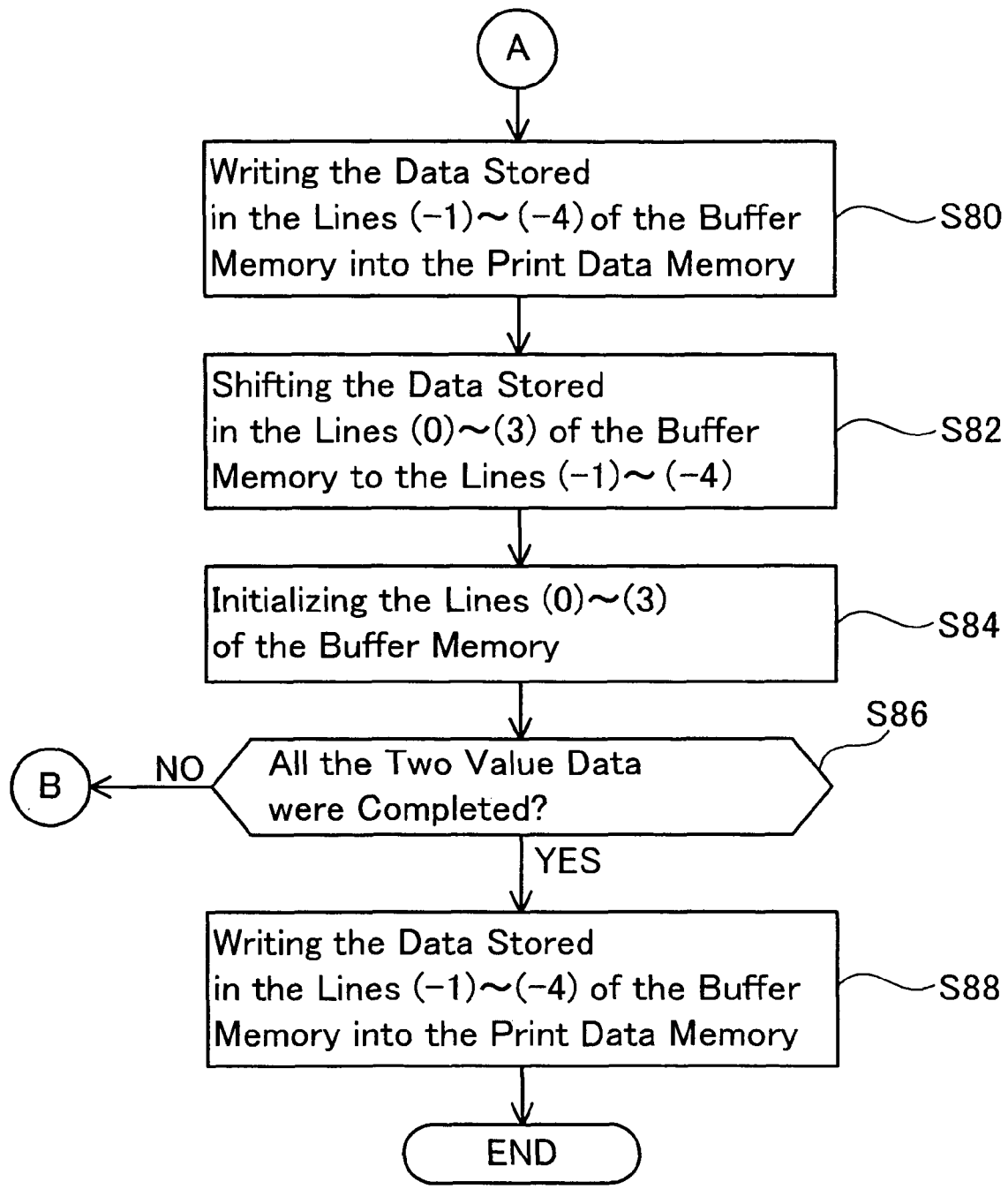
FIG. 10 shows a flowchart of the print data creating process.

If YES is determined at S86 of FIG. 10, the process proceeds to S88. In S88, the information of the upper storage region 46au of the buffer memory 46a is written into the print data memory 47e. For example, in the case where the one line data of the line M+2 is the final one line data, the information in the upper storage region 46au of FIG. 15 (f) is written into a block D4 (see FIG. 16) of the print data memory 47e. When the process of S88 has been executed, the print data creating process (S28) of FIG. 8 is completed.

The process of S28 was described in detail using the case of creating cyan print data as an example. The print data can be created for the other colors by executing processes similar to the case for cyan.

The print data for each color includes a plurality of combinations of the coordinate and scale of the dot. For example, in the print data corresponding to cyan shown in FIG. 16, there is the combination of the sub-coordinate (5, M−t) and '2' (medium dot). This sub-coordinate (5, M−t) has been converted from the coordinate (5, M) of the two value data shown in FIG. 11. Further, in FIG. 16, there is the combination of the sub-coordinate (1, M+1−4t) and '3' (large dot). This sub-coordinate (1, M+1−4t) is equivalent to the coordinate (1, M) of the two value data shown in FIG. 11. That is, it could be said that the sub-coordinate (1, M+1−4t) is not a coordinate which has been obtained by the conversion.

When the print data has been created, the process proceeds to S30 of FIG. 8. In S30, a print command is added to the print data created in S28. The print command is a command that follows settings to cause the printer 2 to perform printing.

When S30 has been completed, the print data to which the print command has been added is output to the printer 2 (S32). The process of S32 is executed by the outputting portion 78 of FIG. 4.

When the print data output from the PC 1 has been input to the printer 2, the printer 2 performs the printing operation based on the print data. The printer 2 discharges ink from the nozzles based on the print data. Specifically, the printer 2 applies pulse signals to the piezoelectric elements 120 (see FIG. 2) based on the print data. For example, if the print data includes the combination of the sub-coordinate (1, M+1−4t) and '3' (large dot), as shown in FIG. 16, a large dot is formed at the coordinate (1, M+1−4t), i.e. the coordinate (1, M). Three continuous pulse signals are applied to the piezoelectric element 120 in order to form the large dot. The nozzle 100 for forming the large dot at the coordinate (1, M) has a difference amount of zero (see the row number 1 of FIG. 7). As a result, a large dot is formed at the coordinate (1, M). Two continuous pulse signals are applied to the piezoelectric element 120 in order to form a medium dot, and one pulse signal is applied to the piezoelectric element 120 in order to form a small dot.

As another example, the nozzle 100 for forming a dot at the coordinate (4, M) of the two value data has a difference amount of (−0.2) (see row number 4 of FIG. 7). As a result, when the printer 2 tries to form a dot at the coordinate (4, M), a dot is formed in the neighborhood of the coordinate (4, M−0.2). In this case, the dot is formed at a position that is separated by a large distance from the coordinate (4, M) where the dot was desired. In the present embodiment, the coordinate (4, M) of the two value data of FIG. 11 is converted into the sub-coordinate (4, M+1 −3t). The print data includes the combination of (4, M+1−3t) and '3' (large dot) (see FIG. 16). The printer 2 tries to form a large dot at the coordinate (4, M+1−3t), i.e. at the coordinate (4, M+0.25). In this case, the dot is formed in the neighborhood of the coordinate (4, M+0.05). This coordinate is close to the coordinate (4, M) of the two value data.

The printer 2 does not form dots at sub-coordinates that are combined with '0' in the print data. For example, a cyan dot is not formed at the coordinate (1, M−t) in FIG. 16.

The printer 2 forms the dots at the coordinates based on the information included in the print data. The images instructed by the user are thus printed on the printing paper P.

Figure 17:
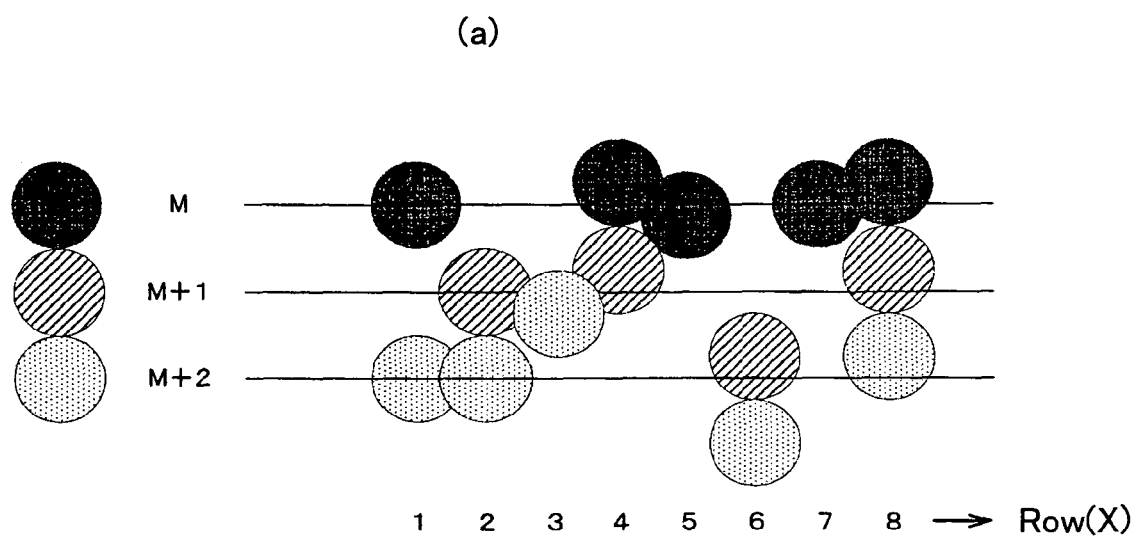
FIG. 17 (a) shows dots formed when the representative embodiment has not been adopted.
Figure 17:
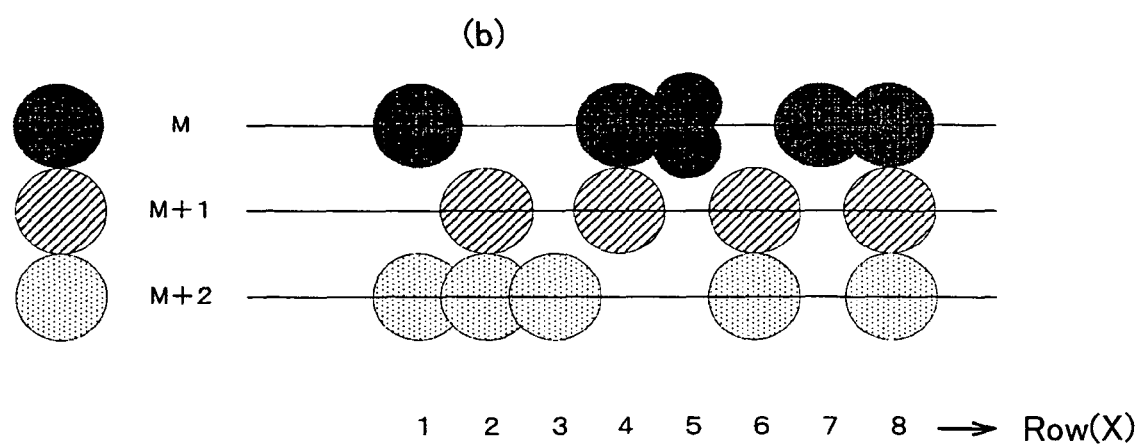
Figure 18:
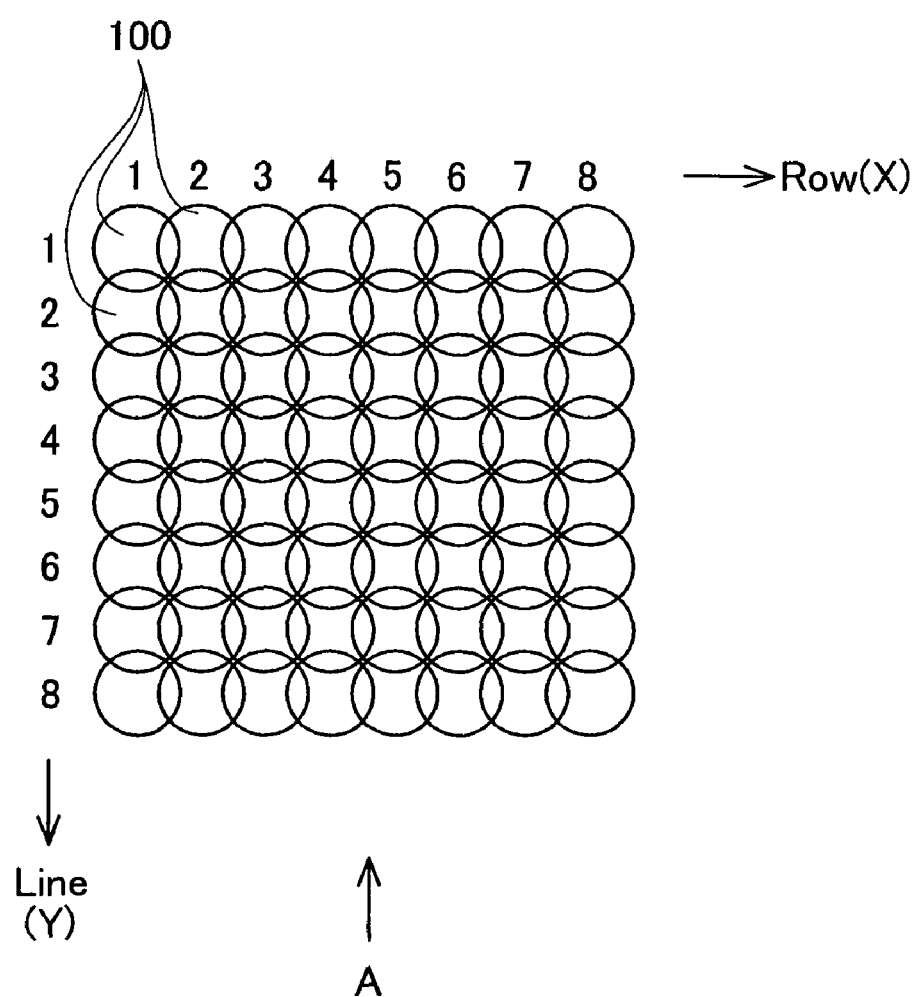
FIG. 18 shows an example of dots.
Figure 19:
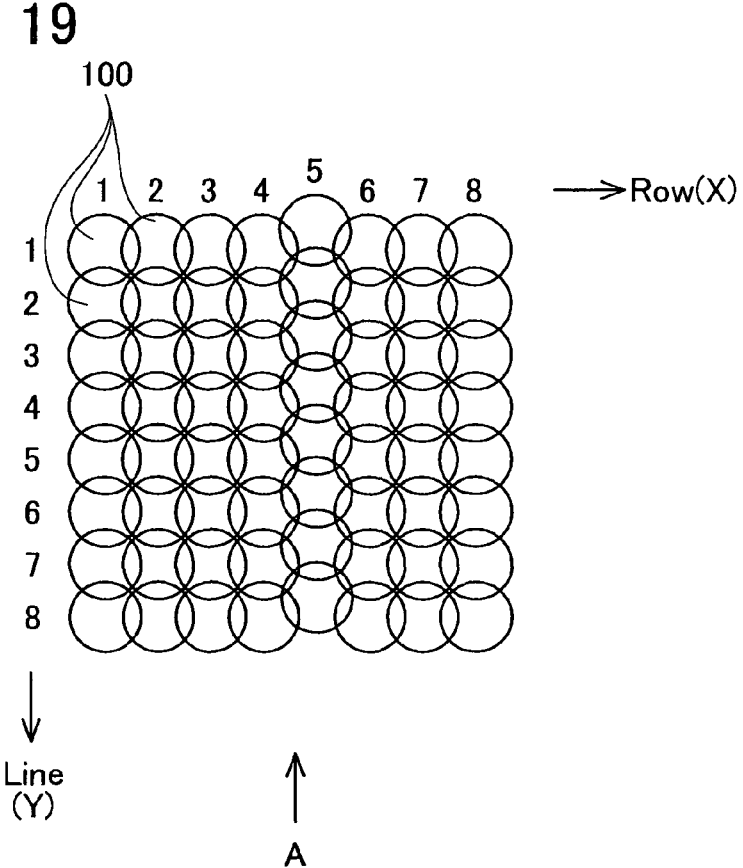
FIG. 19 shows an example of dots formed in the case where one dot row has been displaced.

FIG. 17 (a) shows an example of dots formed when the present embodiment has not been adopted. That is, FIG. 17 (a) shows an example of dots formed by the printer 2 based on the two value data of FIG. 11. FIG. 17 (b) shows an example of dots formed when the present embodiment has been adopted. The row numbers (the X coordinates) in FIG. 17 (a) and (b) correspond to the row numbers (the X coordinates) in FIG. 11 and FIG. 16. Furthermore, M, M+1, and M+2 in FIG. 17 (a) and (b) correspond to the Y coordinates in FIG. 11 and FIG. 16.

As shown in FIG. 17 (a), the dots are not formed at the desired Y coordinates (M, M+1, M+2) when the present embodiment has not been adopted.

In the present embodiment, when the two value data (see FIG. 11) consists of one line data of a line 'a', the print data consists of data of a sub-coordinate of line (4a+4). Consequently, the printer 2 executes the printing operation such that resolution in the Y axis direction (the direction in which the printing paper P is conveyed) is about four times of the two value data. For example, if the resolution of the two value data in the Y axis direction is 600 dpi, the printing operation is executed such that resolution in the Y axis direction is 2400 dpi.

Further, in the present embodiment, the sub-coordinates (p−4, p−3, p−2, p−1) and the sub-coordinates (p0, p1, p2, p3) are combined in the buffer memory 46a in S82 of FIG. 10. This makes it possible to easily create print data when the printer 2 includes nozzles corresponding to the plus difference amount as well as nozzles corresponding to the minus difference amount.

There were eight sub-coordinates in the present embodiment. If the number of sub-coordinates is increased, the difference amount of the nozzles can be adjusted by small units. For example, if a sub-coordinate p' is formed between the sub-coordinate p2 and the sub-coordinate p3, it is possible to adjust a difference amount that is between the difference amount that can be adjusted by the sub-coordinate p2 and the difference amount that can be adjusted by the sub-coordinate p3. However, if the number of sub-coordinates is increased, the amount of data is also increased. To deal with this, one coordinate is converted into two sub-coordinates in the present embodiment. For example, if a nozzle corresponding to a certain coordinate has a difference amount between −0.6875 and −0.5626, the certain coordinate is converted into two adjoining sub-coordinates p2, p3 (see FIG. 14). In this case, the printer 2 executes the printing operation such that a medium dot is formed at each of the sub-coordinates p2 and p3. For example, two medium dots are formed in the neighborhood of the coordinate (5, M) of FIG. 17 (b). The optical density of these two medium dots is similar to the optical density of one large dot. As a result, one large dot appears to be formed at a center of the two medium dots. In the present embodiment, medium dots are formed at two adjacent sub-coordinates (for example, p2 and p3), and consequently a large dot appears to be formed at the center of the two medium dots. The same effect can be achieved by forming the sub-coordinate p' between the sub-coordinate p2 and the sub-coordinate p3. In the present embodiment, the difference amount of the nozzles can be adjusted by small units using a small number of sub-coordinates.

Representative modifications to the aforementioned embodiment will now be described.

(1) In the representative embodiment, the buffer memory 46a is composed of the upper storage region 46au and the lower storage region 46ad. The upper storage region 46au stores data of four lines of sub-coordinates, and the lower storage region 46ad also stores data of four lines of sub-coordinates. Line number x which is composed of the upper storage region 46au and line number y which is composed of the lower storage region 46ad can be varied. For example, the upper storage region 46au can be made a region showing the line numbers '−4' to '0' (x=5). In this case, the lower storage region 46ad is a region showing the line numbers '1' to '3' (y=3).

(2) In the representative embodiment, when one coordinate is converted into two sub-coordinates, a medium dot is combined with one sub-coordinate, and a medium dot is combined with the other second sub-coordinate. However, a variant is possible where, for example, a medium dot is combined with the one sub-coordinate, and a small dot is combined with the other sub-coordinate. These two dots (the medium dot and the small dot) are similar to one large dot.

(3) In the halftone process (S26), the pixel data can be created adopting at least three values (for example, the four values of a large dot, a medium dot, a small dot, and zero). In this case, for example, if one pixel datum having the combination of the coordinate (x, y) and a medium dot is converted into one sub-coordinate (x, y+β), the combination of the sub-coordinate (x, y+β) and a medium dot may be stored in the print data memory 47e. As another example, if one pixel datum having the combination of the coordinate (x, y) and a medium dot is converted into two sub-coordinates (x, y+β1) and (x, y+β2), the combination of the sub-coordinate(x, y+β1) and a small dot, and the combination of the sub-coordinate (x, y+β2) and a small dot may be stored in the print data memory 47e.

As another example, if one pixel datum having the combination of the coordinate (x, y) and a small dot is converted into one sub-coordinate (x, y+β), the combination of the sub-coordinate (x, y+β) and a small dot may be stored in the print data memory 47e. As another example, if one pixel datum having the combination of the coordinate (x, y) and a small dot is converted into two sub-coordinates (x, y+β1) and (x, y+β2), the combination of either of the sub-coordinates and a small dot may be stored in the print data memory 47e. In this case, the combination of the other sub-coordinate and the small dot is not stored in the print data memory 47e.

(4) In the above embodiment, the PC 1 creates the print data. However, the print data creating device 70 (see FIG. 4) may equally well be mounted in the printer 2. In this case, the following variants are possible.

For example, the printer 2 may equally well have a scanner function and be capable of printing scanned images. In this case, the printer 2 creates print data from the bit-mapped data obtained from the scanned image, and executes the printing operation based on the print data that has been created.

Further, the PC 1 may output the two value data obtained at step S26 (see FIG. 8) to the printer 2. The printer 2 may create the print data based on the two value data output from the PC 1.

(5) A computing device other than the PC 1, such as a tablet, a PDA, etc. may be adopted as the print data creating device.

(6) As shown in FIG. 3, the PC 1 and the printer 2 are connected by a cable 40. However, wireless communication may be utilized instead of the cable 40.

(7) The aforementioned printer 2 is a line type printer. However, the present technique may equally well be utilized in a serial type printer in which the ink jet heads move. The print data creating device 70 may equally well create print data utilized by a serial type printer in which the ink jet heads move.

(8) The aforementioned coordinates need not be represented in the form of coordinates. For example, the coordinates can be represented by a combination of the nozzle number of the ink jet printer and the timing with which the ink is discharged.

What is claimed is:

1. A device for creating print data utilized by a printer, the print data creating device comprising:
    a storage configured to store information related to a combination of a position of a pixel and a sub-position of the pixel which is different from the position of the pixel, wherein a distance between a first position on a print medium corresponding to the position of the pixel and a position of a dot formed on the print medium when the printer tries to form the dot at a second position on the print medium corresponding to the sub-position of the pixel is shorter than a distance between the first position on the print medium and a position of a dot formed on the print medium when the printer tries to form the dot at the first position on the print medium; and
    a processor including instructions that when executed operate as:
        a choosing device configured to choose a target pixel included in bit-mapped data, the target pixel being a pixel to which a corresponding dot is to be formed by the printer, the bit-mapped data including a plurality of pixels, each pixel including color information, and the choosing device chooses the target pixel based on the color information included in the target pixel; and a converting device configured to convert a position of the target pixel into a sub-position of the target pixel based on the information stored in the storage so as to create the print data which instructs the printer to try to form a dot at a position on the print medium corresponding to the sub-position of the target pixel.

2. The print data creating device as in claim 1, wherein the printer is an ink jet printer, the ink jet printer comprises a plurality of nozzles for discharging ink toward the print medium and a transferring device for transferring the nozzles and/or the print medium along a Y direction in a state in which at least one nozzle faces the print medium, and each nozzle is offset along a X direction which is perpendicular to the Y direction, and each nozzle is capable of forming a plurality of dots aligned along the Y direction.

3. The print data creating device as in claim 2, wherein the ink jet printer is a line type ink jet printer.

4. The print data creating device as in claim 2, wherein the information stored in the storage includes first combinations, each first combination is a combination of the nozzle and an adjustment amount, the converting device specifies the adjustment amount being combined with the nozzle for forming a corresponding dot of the target pixel and converts the position of the target pixel into the sub-position of the target pixel based on the specified adjustment amount.

5. The print data creating device as in claim 4, wherein the first combinations include second combinations and third combinations, each second combination is a combination of the nozzle and a difference amount between a predetermined position in the Y direction on the print medium and a position in the Y direction of a dot formed on the print medium when the printer tries to form the dot at the predetermined position by discharging ink from the nozzle, and each third combination is a combination of the difference amount and the adjustment amount.

6. The print data creating device as in claim 1, wherein the printer is an ink jet printer, the ink jet printer comprises a plurality of nozzles for discharging ink toward the print medium, the ink jet printer is configured to change a unit ink quantity which is an ink quantity discharged from one nozzle to form one dot on the print medium, and the converting device is configured to create the print data which includes a combination of the sub-position of the target pixel and the unit ink quantity.

7. The print data creating device as in claim 6, wherein the storage stores the information related to a combination of the position of the pixel and at least two neighboring sub-positions of the pixel, the converting device converts the position of the target pixel into at least two neighboring sub-positions of the target pixel.

8. The print data creating device as in claim 1, wherein the print data creating device is configured separately from the printer, the print data creating device is configured to communicate with the printer, and the print data creating device outputs the print data to the printer.

9. A method for creating print data utilized by a printer, the print data creating method comprising:

a choosing step of choosing in a processor a target pixel included in bit-mapped data, the target pixel being a pixel that a corresponding dot is to be formed by the printer, the bit-mapped data including a plurality of pixels, each pixel including color information, and the choosing step choosing the target pixel based on the color information included in the target pixel; and a converting step of converting in said processor a position of the target pixel into a sub-position of the target pixel so as to create the print data which instructs the printer to try to form a dot at a position on the print medium corresponding to the sub-position of the target pixel, wherein a distance between a first position on a print medium corresponding to the position of the target pixel and a position of a dot formed on the print medium when the printer tries to form the dot at a second position on the print medium corresponding to the sub-position of the target pixel is shorter than a distance between the first position on the print medium and a position of a dot formed on the print medium when the printer tries to form the dot at the first position on the print medium.

10. A non-transitory computer readable medium storing a computer program utilized by a computer device to create print data utilized by a printer, wherein the computer program includes instructions for ordering the computer device to perform steps comprising:

a choosing step of choosing a target pixel included in bit-mapped dated, the target pixel being a pixel that a corresponding dot is to be formed by the printer, the bit-mapped data including a plurality of pixels, each pixel including color information, and the choosing step chooses the target pixel based on the color information included in the target pixel;

a converting step of converting a position of the target pixel into a sub-position of the target pixel so as to create the print data which instructs the printer to try to form a dot at a position on the print medium corresponding to the sub-position of the target pixel wherein a distance between a first position on a print medium corresponding to the position of the target pixel and a position of a dot formed on the print medium when the printer tries to form the dot as a second position on the print medium corresponding to the sub-position of the target pixel is shorter than a distance between the first position on the print medium and a position of a dot formed on the print medium when the printer tries to form the dot at the first position on the print medium.

* * * * *